United States Patent
Okanoue et al.

(10) Patent No.: US 7,020,461 B2
(45) Date of Patent: Mar. 28, 2006

(54) PROPAGATION ENVIRONMENT NOTIFICATION METHODS AND NOTIFICATION SYSTEMS IN RADIO COMMUNICATION SYSTEMS, AND RECORD MEDIA RECORDING CONTROL PROGRAMS THEREOF

(75) Inventors: Kazuhiro Okanoue, Tokyo (JP); Shuntaro Yamazaki, Tokyo (JP); Yoshinori Watanabe, Tokyo (JP); Hiroshi Furukawa, Tokyo (JP)

(73) Assignee: NEC Corporation (JP)

( * ) Notice: Subject to any disclaimer, the term of this patent is extended or adjusted under 35 U.S.C. 154(b) by 597 days.

(21) Appl. No.: 09/894,396

(22) Filed: Jun. 28, 2001

(65) Prior Publication Data

US 2002/0002046 A1 Jan. 3, 2002

(30) Foreign Application Priority Data

| Jun. 30, 2000 | (JP) | 2000-198057 |
| Oct. 4, 2000 | (JP) | 2000-304293 |
| Oct. 23, 2000 | (JP) | 2000-322072 |
| Mar. 2, 2001 | (JP) | 2001-057579 |

(51) Int. Cl.
*H04Q 7/20* (2006.01)

(52) U.S. Cl. ............. 455/423; 455/67.11; 455/424; 455/425; 703/2; 703/22

(58) Field of Classification Search ............ 455/67.7, 455/67.11, 423, 424, 425, 446; 703/2, 22
See application file for complete search history.

(56) References Cited

U.S. PATENT DOCUMENTS

| 5,491,644 | A | * | 2/1996 | Pickering et al. | ........... 709/226 |
| 5,561,841 | A | | 10/1996 | Markus | |
| 5,758,264 | A | | 5/1998 | Bonta et al. | |
| 5,890,076 | A | * | 3/1999 | Takano et al. | ............ 455/561 |
| 5,987,328 | A | | 11/1999 | Ephrenmides et al. | |
| 6,317,599 | B1 | * | 11/2001 | Rappaport et al. | .......... 455/446 |
| 6,347,398 | B1 | * | 2/2002 | Parthasarathy et al. | ..... 717/178 |
| 6,356,758 | B1 | * | 3/2002 | Almeida et al. | ............ 455/446 |

FOREIGN PATENT DOCUMENTS

| EP | 0 848 564 | 6/1998 |
| EP | 0 928 121 | 7/1999 |
| JP | 5-226853 | 9/1993 |

(Continued)

OTHER PUBLICATIONS

J.W. McKown et al. "Ray Tracing as a design tool for radio networks" IEEE magazine, Nov. 1991, pp 27–30.*

(Continued)

*Primary Examiner*—William Trost
*Assistant Examiner*—Stephen D'Agosta
(74) *Attorney, Agent, or Firm*—Dickstein, Shapiro, Morin & Oshinsky, LLP.

(57) ABSTRACT

To provide a propagation environment notification method in radio communication allowing a user to easily understand radio propagation environment information. When receiving a service start command C1 from a user terminal 100, a server 102 transfers software for clients to the user terminal 100 (C2). The user terminal 100 starts the transferred software for clients, and a user condition inputting process P2 is carried out to collect user specific information and radio base station information and transfer the same to the server 102 (C3). When receiving the information, the server 102 starts a distribution information generating process P1 for generating radio propagation environment information based on the information, and the generated information is transferred to the user terminal 100 (C4), and is converted into a format convenient for the user by the software for clients transferred on the user terminal 100, and displayed on the user terminal 100 (P3).

102 Claims, 27 Drawing Sheets

FOREIGN PATENT DOCUMENTS

| | | |
|---|---|---|
| JP | 7-36063 | 2/1995 |
| JP | 7-87557 | 3/1995 |
| JP | 08-008846 | 1/1996 |
| JP | 8-214363 | 8/1996 |
| JP | 09-135475 | 5/1997 |
| WO | WO 99/59368 | 11/1999 |

OTHER PUBLICATIONS

J.W. McKown, et al., "Ray Tracing As A Design Tool For Radio Networks", IEEE Network Magazine, Nov. 1991, pp. 27–30.

Specifications of Wireless LAN (local area network), ISO/IEC 8802–11, Information Technology—Telecommunications And Information Exchange Between Systems—Local And Metropolitan Area Networks—Specific Requirements—Part 11: Wireless LAN Medium Access Control (MAC) and Physical Layer (PHY) Specifications, 8 pages.

Specification of the Bluetooth System, Wireless Connections Made Easy, Dec. 1, 1999, v1.0 B, 11 pages.

European Search Report dated May 6, 2003.

Japanese Office Action issued Apr. 6, 2004 (w/ English translation of relevant portions).

J.W. McKown, et al., "Ray Tracing As A Design Tool For Radio Networks", IEEE Network Magazine, Nov. 1991, pp. 27–30.

Specifications of Wireless LAN (local area network), ISO/IEC 8802–11, Information Technology –Telecommunications And Information Exchange Between Systems –Local And Metropolitan Area Networks –Specific Requirements –Part 11: Wireless LAN Medium Access Control (MAC) and Physical Layer (PHY) Specifications, 8 pages.

Specification of the Bluetooth System, Wireless Connections Made Easy, Dec. 1, 1999, v1.0 B, 11 pages.

* cited by examiner

| POSITION (METER) | | | | | | MATERIAL |
|---|---|---|---|---|---|---|
| x1 | x2 | y1 | y2 | z | h | |
| 1.5 | 2.1 | 1.2 | 1.2 | 1.2 | 0.05 | METAL |
| 1.5 | 1.6 | 1.2 | 1.3 | 1.15 | 0.8 | TIMBER |
| ⋮ | ⋮ | ⋮ | ⋮ | ⋮ | ⋮ | ⋮ |
| 2.0 | 2.1 | 1.2 | 1.3 | 1.15 | 0.8 | TIMBER |

| POSITION(METER) | | | ANTENNA | SENDING ELECTRIC POWER |
|---|---|---|---|---|
| x | y | z | | |
| 3.0 | 1.5 | 1.0 | DIBALL | 100mW |

| OBSERVATION AREA | | | | | COMMUNICATION POSSIBILITY |
|---|---|---|---|---|---|
| HEIGHT ABOVE FLOOR | x1 | x2 | y1 | y2 | |
| 100 cm | 0 cm | 10 cm | 0 cm | 10 cm | IMPOSSIBLE |
| | 0 cm | 10 cm | 10 cm | 20 cm | POSSIBLE |
| | 0 cm | 10 cm | 20 cm | 30 cm | GOOD |
| | 0 cm | 10 cm | 30 cm | 40 cm | VERY GOOD |
| ⋮ | ⋮ | ⋮ | ⋮ | ⋮ | ⋮ |

| OBSERVATION AREA ID | RECEIPT ELECTRIC POWER | DELAY VARIANCE |
|---|---|---|
| 1 | −60 dBm | 20 NANOSECONDS |
| 2 | −65 dBm | 150 NANOSECONDS |
| 3 | −68 dBm | 30 NANOSECONDS |
| 4 | −72 dBm | 200 NANOSECONDS |
| 5 | −88 dBm | 20 NANOSECONDS |
| ⋮ | ⋮ | ⋮ |
| M | | |

FIG. 16

| TYPE OF SYSTEM | POSITION (METER) | | | ANTENNA | SENDING ELECTRIC POWER |
|---|---|---|---|---|---|
| | x | y | z | | |
| HIGH SPEED WIRELESS LAN | 2.0 | 1.0 | 1.0 | DIBALL | 100 mW |
| SHORT RANGE RADIO | 3.0 | 2.0 | 1.0 | DIBALL | 1 mW |
| MICROWAVE OVEN | 1.0 | 1.5 | 1.0 | --- | 20 mW |

FIG.18

| OBSERVATION POINT ID | SYSTEM ID=1 | | SYSTEM ID=2 | | SYSTEM ID=3 | |
|---|---|---|---|---|---|---|
| | RECEIPT ELECTRIC POWER | DELAY VARIANCE | RECEIPT ELECTRIC POWER | DELAY VARIANCE | RECEIPT ELECTRIC POWER | DELAY VARIANCE |
| 1 | −60 dBm | 20 NANO SECONDS | −88 dBm | 20 NANO SECONDS | −88 dBm | 120 NANO SECONDS |
| 2 | −65 dBm | 150 NANO SECONDS | −88 dBm | 40 NANO SECONDS | −90 dBm | 80 NANO SECONDS |
| 3 | −68 dBm | 30 NANO SECONDS | −70 dBm | 80 NANO SECONDS | −88 dBm | 80 NANO SECONDS |
| 4 | −72 dBm | 200 NANO SECONDS | −88 dBm | 60 NANO SECONDS | −86 dBm | 100 NANO SECONDS |
| 5 | −88 dBm | 20 NANO SECONDS | −70 dBm | 20 NANO SECONDS | −88 dBm | 80 NANO SECONDS |
| ····· | ····· | | ····· | | ····· | |
| M | | | | | | |

FIG. 20

| OBSERVATION POINT ID | SYSTEM ID=1 | | | | | SYSTEM ID=2 | | | | | SYSTEM ID=3 | | | | |
|---|---|---|---|---|---|---|---|---|---|---|---|---|---|---|---|
| | RECEIPT ELECTRIC POWER | TOTAL INTERFERENCE ELECTRIC POWER | TOTAL CI RATIO | INDIVIDUAL CI RATIO (ID=2) | INDIVIDUAL CI RATIO (ID=3) | RECEIPT ELECTRIC POWER | TOTAL INTERFERENCE ELECTRIC POWER | TOTAL CI RATIO | INDIVIDUAL CI RATIO (ID=1) | INDIVIDUAL CI RATIO (ID=3) | RECEIPT ELECTRIC POWER | TOTAL INTERFERENCE ELECTRIC POWER | TOTAL CI RATIO | INDIVIDUAL CI RATIO (ID=1) | INDIVIDUAL CI RATIO (ID=2) |
| 1 | -60dBm | -85dBm | 25dB | 28dB | 28dB | -88dBm | -60dBm | -28dB | -28dB | 0dB | -88dBm | -60dBm | -28dB | -28dB | 0dB |
| 2 | -65dBm | -86dBm | 21dB | 23dB | 25dB | -88dBm | -65dBm | -23dB | -23dB | 2dB | -90dBm | -65dBm | -25dB | -25dB | -2dB |
| 3 | -68dBm | -70dBm | 2dB | 2dB | 20dB | -70dBm | -68dBm | -2dB | -2dB | 18dB | -88dBm | -66dBm | -22dB | -20dB | -18dB |
| 4 | -72dBm | -84dBm | 12dB | 16dB | 14dB | -88dBm | -72dBm | -16dB | -16dB | -2dB | -86dBm | -72dBm | -14dB | -14dB | 2dB |
| 5 | -88dBm | -70dBm | -18dB | -18dB | 0dB | -70dBm | -85dBm | 15dB | 18dB | 18dB | -88dBm | -70dBm | -18dB | 0dB | -18dB |
| ... | ... | ... | ... | ... | ... | ... | ... | ... | ... | ... | ... | ... | ... | ... | ... |
| M | | | | | | | | | | | | | | | |

*FIG.23*

| HEIGHT ABOVE FLOOR | OBSERVATION AREA ||||||| COMMUNICATION POSSIBILITY |||
|---|---|---|---|---|---|---|---|---|---|
| | OBSERVATION POINT ID | x1 | x2 | y1 | y2 | | SYSTEM ID=1 | SYSTEM ID=2 | SYSTEM ID=3 |
| 100 cm | 1 | 0 cm | 10 cm | 0 cm | 10 cm | | C | A | B |
| | 2 | 0 cm | 10 cm | 10 cm | 20 cm | | A | D | C |
| | 3 | 0 cm | 10 cm | 20 cm | 30 cm | | D | C | D |
| | 4 | 0 cm | 10 cm | 30 cm | 40 cm | | B | B | A |
| | ..... | ..... | ..... | ..... | ..... | | ..... | ..... | ..... |

FIG.24

| INTERFERENCE DEGRADATION LEVEL / RECEIPT POSSIBILITY | LARGE | MIDDLE | SMALL |
|---|---|---|---|
| VERY GOOD | D | B | A |
| GOOD | D | C | B |
| POSSIBLE | D | D | C |
| IMPOSSIBLE | D | D | D |

FIG.25

| COLOR NUMBER | NAME | COLOR NUMBER | NAME |
|---|---|---|---|
| CL000 | LIGHT RED | CL008 | SEMI-DARK RED |
| CL001 | LIGHT YELLOW | CL009 | SEMI-DARK YELLOW |
| CL002 | LIGHT GREEN | CL010 | SEMI-DARK GREEN |
| CL003 | LIGHT BLUE | CL011 | SEMI-DARK BLUE |
| CL004 | SLIGHTLY DARK RED | CL012 | DARK RED |
| CL005 | SLIGHTLY DARK YELLOW | CL013 | DARK YELLOW |
| CL006 | SLIGHTLY DARK GREEN | CL014 | DARK GREEN |
| CL007 | SLIGHTLY DARK BLUE | CL015 | DARK BLUE |

```
DELAY
VARIANCE
```

|  | CL015 | CL011 | CL007 | CL003 |
| --- | --- | --- | --- | --- |
| DELAY VARIANCE THRESHOLD VALUE 3 | | | | |
| | CL014 | CL010 | CL006 | CL002 |
| DELAY VARIANCE THRESHOLD VALUE 2 | | | | |
| | CL013 | CL009 | CL005 | CL001 |
| DELAY VARIANCE THRESHOLD VALUE 1 | | | | |
| | CL012 | CL008 | CL004 | CL000 |

RECEIPT ELECTRIC POWER THRESHOLD VALUE 1   RECEIPT ELECTRIC POWER THRESHOLD VALUE 2   RECEIPT ELECTRIC POWER THRESHOLD VALUE 3    RECEIPT ELECTRIC POWER

*FIG.28*

| COLOR NUMBER | NAME |
|---|---|
| CL000 | RED |
| CL001 | YELLOWISH RED |
| CL002 | REDDISH YELLOW |
| CL003 | YELLOW |
| CL004 | BLUISH YELLOW |
| CL005 | YELLOWISH BLUE |
| CL006 | BLUE |
| CL007 | GREENISH BLUE |

| COLOR NUMBER | NAME |
|---|---|
| CL008 | BLUISH GREEN |
| CL009 | GREEN |
| CL010 | REDDISH GREEN |
| CL011 | GREENISH RED |
| CL012 | PALE RED |
| CL013 | PALE YELLOW |
| CL014 | PALE GREEN |
| CL015 | PALE BLUE |

*FIG.29*

DELAY VARIANCE

| | | | | |
|---|---|---|---|---|
| | CL006 | CL007 | CL008 | CL009 |
| DELAY VARIANCE THRESHOLD VALUE 3 | | | | |
| | CL005 | CL015 | CL014 | CL010 |
| DELAY VARIANCE THRESHOLD VALUE 2 | | | | |
| | CL004 | CL013 | CL012 | CL011 |
| DELAY VARIANCE THRESHOLD VALUE 1 | | | | |
| | CL003 | CL002 | CL001 | CL000 |

RECEIPT ELECTRIC POWER THRESHOLD VALUE 1    RECEIPT ELECTRIC POWER THRESHOLD VALUE 2    RECEIPT ELECTRIC POWER THRESHOLD VALUE 3    RECEIPT ELECTRIC POWER

FIG.30

| INTERFERENCE DEGRADATION LEVEL / RECEIPT POSSIBILITY | LARGE | MIDDLE | SMALL |
|---|---|---|---|
| VERY GOOD | CL002 | CL001 | CL000 |
| GOOD | CL006 | CL005 | CL004 |
| POSSIBLE | CL010 | CL009 | CL008 |
| IMPOSSIBLE | CL014 | CL013 | CL012 |

FIG. 32

| OBSERVATION POINT ID | SYSTEM ID=1 | | | SYSTEM ID=2 |
|---|---|---|---|---|
| | TOTAL INTERFERENCE ELECTRIC POWER | RECEIPT ELECTRIC POWER | SENDING POINT CI RATIO | |
| 1 | −70 dBm | −60 dBm | 10 dB | ... |
| 2 | −70 dBm | −65 dBm | 5 dB | ... |
| 3 | −70 dBm | −68 dBm | 2 dB | ... |
| 4 | −70 dBm | −72 dBm | −2 dB | ... |
| 5 | −70 dBm | −88 dBm | −18 dB | ... |
| ... | ... | ... | ... | ... |
| M | | | | |

| OBSERVATION POINT ID | SYSTEM ID=1 | | | SYSTEM ID=2 |
|---|---|---|---|---|
| | SENDING POINT CI RATIO / INTERFERENCE DEGRADATION LEVEL | TOTAL CI RATIO / INTERFERENCE DEGRADATION LEVEL | MIN (TOTAL CI RATIO, SENDING POINT CI RATIO) / INTERFERENCE DEGRADATION LEVEL | |
| 1 | 10 dB MIDDLE | 25 dB SMALL | 10 dB MIDDLE | |
| 2 | 5 dB LARGE | 21 dB SMALL | 5 dB LARGE | |
| 3 | 2 dB LARGE | 2 dB SMALL | 2 dB LARGE | |
| 4 | -2 dB LARGE | 12 dB MIDDLE | -2 dB LARGE | |
| 5 | -18 dB LARGE | -18 dB LARGE | -18 dB LARGE | |
| ... | ... | ... | ... | |
| M | | | | |

↑ INTERFERENCE DEGRADATION LEVEL FOR ONE-WAY COMMUNICATION OF EACH OBSERVATION POINT→INTERFERENCE DEGRADATION LEVEL OF SENDING POINT ID ENTIFIABLE BY SYSTEM ID

↑ INTERFERENCE DEGRADATION LEVEL FOR ONE-WAY COMMUNICATION OF SENDING POINT IDENTIFIABLE BY SYSTEM ID→EACH OBSERVATION POINT

↑ INTERFERENCE DEGRADATION LEVEL FOR TWO-WAY COMMUNICATION BETWEEN SENDING POINT IDENTIFIABLE BY SYSTEM ID AND EACH OBSERVATION POINT

*FIG. 33*

PROPAGATION ENVIRONMENT NOTIFICATION METHODS AND NOTIFICATION SYSTEMS IN RADIO COMMUNICATION SYSTEMS, AND RECORD MEDIA RECORDING CONTROL PROGRAMS THEREOF

BACKGROUND OF THE INVENTION

1. Field of the Invention

The present invention relates to propagation environment notification methods and notification systems in radio communication systems, and media recording control programs thereof, and particularly relates to propagation environment notification methods and notification systems in radio communication systems in which user specific conditions such as a user's area layout and placement of a radio base station are inputted via a network such as Internet to provide information of radio propagation environment in each user's area based on expert knowledge, and record media recording programs thereof.

2. Description of the Prior Art

The base station placement design for a radio communication system constituted by radio base stations and radio terminals in an environment where obstacles exist, like an environment where appliances such as desks/shelves are placed depending on user's preferences, is a design matter involving expert knowledge. In this environment, influences such as reflection and refraction of radio waves by obstacles vary depending on the placement of the base station, and thus significant variation occurs as to shadow areas where communication is impossible.

For example, an indoor environment as shown in FIG. 13 will be considered. FIG. 13 shows one example of an area where radio communication is impossible. In this figure, reference numerals 1000-1 to 1000-4 denote walls, by which one indoor environment is defined. Also, reference numerals 1001-1 to 1001-3 denote partitions partitioning respective rooms. In addition, as appliances, desks denoted by reference numerals 1003-1 to 1003-3, a shelf denoted by reference numeral 1002, and a sofa denoted by reference numeral 1004 are provided. In this indoor environment, if a radio base station 1010 is placed on the desk 1003-1, for example, a hatched area in this figure at some distance from the radio base station 1010 becomes a shadow area, in which communication is impossible.

Also, it can be considered that if the radio base station 1010 is placed on the desk 1003-2, shadow areas (hatched area in this figure) are created, for example, near the walls 1000-4 and 1000-1, and communication therein becomes impossible, as shown in FIG. 14 showing a second example of areas where radio communication becomes impossible. These hatched areas depend on the walls 1000-1 to 1000-4, partitions 1001-1 to 1001-3, the materials of appliances, the placement of appliances and the distance between partitions, and thus it is difficult for users who have no expert knowledge to predict shadow areas.

On the other hand, for solving these problems of placing stations of radio systems, a base station setting system in which a plurality of predefined base station placement candidate points is defined for a predefined service providing area in a building, and then a base station placement candidate point is selected and a notification thereof is made so that the entire service area can be covered is disclosed in Japanese Patent Laid-Open No. 7-87557 (hereinafter referred to as Document 1), for example. Also, in Japanese Patent Laid-Open No. 8-214363 (herein after referred to as Document 2), a method is disclosed in which base station placement points are determined one after another in such a manner that radio shadow areas are reduced, in order to determine the placement of the base station allowing no radio shadow areas to occur.

These systems shown in Documents 1 and 2 basically minimize radio shadow areas, based on the magnitude of receipt electric power. Furthermore, as shown in Japanese Patent Laid-Open No. 5-226853 (hereinafter referred to as Document 3), a base station setting system in which a plurality of predefined base station placement candidate points is defined for a predefined service providing area in a building, and then a base station placement candidate point is selected and a notification thereof is made so that the entire service area can be covered is known. Also, in Japanese Patent Laid-Open No. 7-036063(hereinafter referred to as Document 4), a method is shown in which base station placement points are determined one after another in such a manner that radio shadow areas are reduced, in order to determine the placement of the base station allowing no radio shadow areas to occur. These systems basically minimize radio shadow areas, based on the magnitude of receipt electric power.

BRIEF SUMMARY OF THE INVENTION

Object of the Invention

When a general user establishes a radio communication system in the user's area, however, the user does not necessarily have expert knowledge associated with radio wave propagation, thus making it difficult to predict shadow areas to perform stable radio communication. Also, even though stable radio communication can be achieved, the radio propagation environment is changed if the area layout is changed, and thus communication cannot necessarily performed after changing the layout. Thus, in order that the user establishes a radio system, it is important that the user himself can easily define the placement of appliances and the position of the base station in the area, and understands the user's area radio propagation environment. If the radio propagation environment can be understood, the user himself can make a fine adjustment of the position of the base station so that the user can perform communication in the position desired by the user.

In the prior arts, however, since the mechanism of defining a building structure by the user himself is not precise, and only base station information is given to the user, unpredicted radio shadow areas may be created if the user makes a fine adjustment flexibly. Furthermore, in the case where different radio systems coexist, a situation in which communication cannot be performed although radio waves arrive may occur unless not only radio shadow areas but also mutual interference among systems is taken into account. For example, radio systems given in specifications of wireless LAN (local area network), ISO/IEC8802-11, Information technology-Telecommunications and information exchange between systems-Local and metropolitan area networks-Specific requirements-Part 11: Wireless LAN Medium Access Control (MAC) and Physical Layer (PHY) specifications and in radio systems given in BLUETOOTH SPECIFICATION Version 1.0B, it is assumed that the same frequency domain is used as a send/receive frequency, thus causing mutual interference. Also, there exist systems emitting radio waves during operations, such as a microwave oven and medical apparatus. In this way, in consideration of not only a radio communication system but also apparatus systems, the case where mutual interference occurs should be taken into account.

On the other hand, means for solving these problems is not disclosed in any of the aforesaid Documents 1 to 4.

Thus an object of the present invention is to provide propagation environment notification methods and propagation environment notification systems in radio communication, in which the user himself can easily understand his local radio propagation environment information.

SUMMARY OF THE INVENTION

To solve the aforesaid problems, a first invention according to the present invention is a propagation environment notification method in a radio communication system constituted by a radio base station and a radio terminal, characterized by comprising a first step of sending conditions about the user's area layout from a user terminal to a server via a communication line, a second step of generating the above described user's area radio propagation environment information based on the above described conditions by the above described server receiving the above described conditions, and a third step of sending the above described radio propagation environment information from the above described server to the above described user terminal via the communication line.

Also, a second invention according to the present invention is a propagation environment notification system in a radio communication system constituted by a radio base station and a radio terminal, characterized by comprising condition sending means for sending conditions about the user's area layout from a user terminal to a server via a communication line, information generating means for generating the above described user's area radio propagation environment information based on the above described conditions by the above described server receiving the above described conditions, and information sending means for sending the above described radio propagation environment information from the above described server to the above described user terminal via the communication line. Also, a third invention according to the present invention is a user terminal for use in a propagation environment notification system in a radio communication system constituted by a radio base station and a radio terminal, characterized by comprising condition sending means for sending conditions about the user's area layout from a user terminal to an object apparatus via a communication line and information receiving means for receiving radio propagation environment information for the above described conditions from the above described object apparatus via the communication line.

Also, a fourth invention according to the present invention is a server for use in a propagation environment notification system in a radio communication system constituted by a radio base station and a radio terminal, characterized by comprising condition receiving means for receiving conditions about the user's area layout from a user apparatus via a communication line and information sending means for sending radio propagation environment information for the above described conditions to the above described user apparatus via the communication line.

Also, a fifth invention according to the present invention is a record medium recording therein a control program of a propagation environment notification method in a radio communication system constituted by a radio base station and a radio terminal, characterized in that the above described propagation environment notification method comprising a first step of sending conditions about the user's area layout from a user terminal to a server via a communication line, a second step of generating the above described user's area radio propagation environment information based on the above described conditions by the above described server receiving the above described conditions, and a third step of sending the above described radio propagation environment information from the above described server to the above described user terminal via the communication line, wherein the above described first step is comprised of a twenty-first step of performing input and edition of user conditions (the above described user's area appliance placement information and the above described radio base station information), a twenty-second step of making a determination on whether or not the above described user's conditions are correctly inputted, a twenty-third step of making a determination on completion of the above described input of conditions, a twenty-fourth step of converting the above described input conditions into formats capable of being used on the above described server's part, and a condition inputting step of inputting the above described conditions by the above described user terminal, and a program comprised of these twenty-first to twenty-fourth steps is recorded in the above described record medium.

Furthermore, it is characterized that the above described second step is comprised of a forty-first step of defining the number of observation areas M for an observation area ID that is a variable for identifying observation areas, a forty-second step of using ray tracing to estimate a propagation property in the observation area defined by the above described observation area ID, a forty-third step of storing the receipt electric power and delay variance equivalent to the result obtained in the above described forty-second step in propagation property data having an arrangement with the above described observation area ID as an index, a forty-fourth step of subtracting 1 from the above described observation area ID, a forty-fifth step of making a determination on whether or not the above described observation area ID is greater than 1, and a forty-sixth step of making a determination on possibility of communication in each observation area if the above described observation area ID is smaller than 1 as a result of this determination, and a control program comprised of these forty-first to forty-sixth steps is recorded in the above described record medium.

Also, a sixth invention according to the present invention is a propagation environment notification method in a radio communication system constituted by radio base station and a radio terminal, characterized in that the above described radio base station is configured as a plurality of radio base stations, and the above described second step comprises a fifty-first step of estimating a propagation environment for a radio wave emitted from each of the above described plurality of radio base stations in the above described user's area layout to generate individual radio wave propagation environment information, a fifty-second step of using the above described individual radio wave propagation environment information to calculate a signal-to-interference ratio expressed by the ratio between the receipt electric power from the targeted above described radio base stations and the receipt electric power from the non-targeted above described radio base stations, and a fifty-third step of generating the above described radio propagation environment information for estimating the possibility of communication in the above described user's area layout, based on the above described individual radio wave propagation environment information and the above described signal-to-interference ratio.

Also, a seventh invention according to the present invention is a propagation environment notification system in a radio communication system constituted by radio base station and a radio terminal, characterized in that the above described radio base station is configured as a plurality of radio base stations, and the above described information generating means comprises individual radio wave propagation environment information generating means for estimating a propagation environment for a radio wave emitted from each of the above described plurality of radio base stations in the above described user's area layout to generate individual radio wave propagation environment information, signal-to-interference ratio calculating means for using the above described individual radio wave propagation environment information to calculate a signal-to-interference ratio expressed by the ratio between the receipt electric power from the targeted above described radio base stations and the receipt electric power from non-the targeted above described radio base stations, and communication possibility estimating means for generating the above described radio propagation environment information for estimating the possibility of communication in the above described user's area layout, based on the above described individual radio wave propagation environment information and the above described signal-to-interference ratio.

Also, an eighth invention according to the present invention is a user terminal for use in a propagation environment notification system in a radio communication system constituted by a radio base station and a radio terminal, characterized in that the above described radio base station is configured as a plurality of radio base stations, and the above described information receiving means comprises individual radio wave propagation environment information generating means for estimating a propagation environment for a radio wave emitted from each of the above described plurality of radio base stations in the above described user's area layout to generate individual radio wave propagation environment information, signal-to-interference ratio calculating means for using the above described individual radio wave propagation environment information to calculate a signal-to-interference ratio expressed by the ratio between the receipt electric power from the targeted above described radio base stations and the receipt electric power from non-the targeted above described radio base stations, and communication possibility information receiving means for receiving the above described radio propagation environment information for estimating the possibility of communication in the above described user's area layout, based on the above described individual radio wave propagation environment information and the above described signal-to-interference ratio.

Also, a ninth invention according to the present invention is a server for use in a propagation environment notification system in a radio communication system constituted by a radio base station and a radio terminal, characterized in that the above described radio base station is configured as a plurality of radio base stations, and the above described information sending means comprises individual radio wave propagation environment information generating means for estimating a propagation environment for a radio wave emitted from each of the above described plurality of radio base stations in the above described user's area layout to generate individual radio wave propagation environment information, signal-to-interference ratio calculating means for using the above described individual radio wave propagation environment information to calculate a signal-to-interference ratio expressed by the ratio between the receipt electric power from the targeted above described radio base stations and the receipt electric power from non-the targeted above described radio base stations, and communication possibility information sending means for sending the above described radio propagation environment information for estimating the possibility of communication in the above described user's area layout, based on the above described individual radio wave propagation environment information and the above described signal-to-interference ratio.

Also, a tenth invention according to the present invention is a record medium recording a control program of a propagation environment notification method in a radio communication system constituted by a radio base station and a radio terminal, characterized in that the above described radio base station is configured as a plurality of radio base stations, and the above described second step comprises a fifty-first step of estimating a propagation environment for a radio wave emitted from each of the above described plurality of radio base stations in the above described user's area layout to generate individual radio wave propagation environment information, a fifty-second step of using the above described individual radio wave propagation environment information to calculate a signal-to-interference ratio expressed by the ratio between the receipt electric power from the targeted above described radio base stations and the receipt electric power from non-the targeted above described radio base stations, and a fifty-third step of generating the above described radio propagation environment information for estimating the possibility of communication in the above described user's area layout, based on the above described individual radio wave propagation environment information and the above described signal-to-interference ratio.

Also, an eleventh invention according to the present invention is characterized in that the above described receipt electric power and delay variance information is expressed in a visually identifiable form, and the above described radio propagation environment information corresponding to the above described receipt electric power and delay variance information is also expressed in a visually identifiable form.

Also, a twelfth invention according to the present invention is characterized in that the above described interference degradation level information and receipt possibility evaluation information is expressed in a visually identifiable form, and the above described radio propagation environment information corresponding to the above described interference degradation level information and receipt possibility evaluation information is also expressed in a visually identifiable form.

Also, a thirteenth invention according to the present invention is characterized in that the above described fifty-second step comprises a sixty-sixth step of computing the receipt electric power from non-the targeted above described radio base stations at positions in which the targeted above described radio base stations are placed, as the interference electric power in targeted base stations, and a sixty-seventh step of computing the ratio between the receipt electric power when the targeted above described radio base stations receive radio waves sent from respective observation points and the interference electric power in the targeted above described base stations (signal-to-interference ratio).

Also, a fourteenth invention according to the present invention is characterized in that the above described signal-to-interference ratio calculating means comprises first computing means for computing the receipt electric power from non-the targeted above described radio base stations at positions in which the targeted above described radio base stations are placed, as the interference electric power in targeted base stations, and second computing means for computing the ratio between the receipt electric power when the targeted above described radio base stations receive radio waves sent from respective observation points and the interference electric power in the targeted above described base stations (signal-to-interference ratio).

Also, a fifteenth invention according to the present invention is characterized in that the above described signal-to-interference ratio calculating means comprises first computing means for computing the receipt electric power from non-the targeted above described radio base stations at positions in which the targeted above described radio base stations are placed, as the interference electric power in targeted base stations, and second computing means for computing the ratio between the receipt electric power when the targeted above described radio base stations receive radio waves sent from respective observation points and the interference electric power in the targeted above described base stations (signal-to-interference ratio).

Also, a sixteenth invention according to the present invention is characterized in that the above described signal-to-interference ratio calculating means comprises first computing means for computing the receipt electric power from non-the targeted above described radio base stations at positions in which the targeted above described radio base stations are placed, as the interference electric power in targeted base stations, and second computing means for computing the ratio between the receipt electric power when the targeted above described radio base stations receive radio waves sent from respective observation points and the interference electric power in the targeted above described base stations (signal-to-interference ratio).

Also, a seventeenth invention according to the present invention is characterized in that the above described fifty-second step comprises a sixty-sixth step of computing the receipt electric power from non-the targeted above described radio base stations at positions in which the targeted above described radio base stations are placed, as the interference electric power in targeted base stations, and a sixty-seventh step of computing the ratio between the receipt electric power when the targeted above described radio base stations receive radio waves sent from respective observation points and the interference electric power in the targeted above described base stations (signal-to-interference ratio).

According to the first to fifth inventions according to the present invention, when user specific information (user's area appliance placement information) and radio base station information are sent from a user terminal to a server via a communication line, the above described server generates radio propagation environment information based on the user specific information and the radio base station information and sends back the radio propagation environment information to the above described user terminal via the communication line, thus enabling the user himself to easily understand user's area radio propagation environment information.

Also, according to the sixth to tenth inventions according to the present invention, radio propagation environment information allowing for interference is obtained even in the case where a plurality of radio base stations and other radio wave emission sources exist.

Also, according to the eleventh and twelfth inventions according to the present invention, two conditions such as the receipt electric power and delay variance or the interference degradation level and receipt possibility can be distinguished from each other by difference in color using brightness information and chromaticity information, and expressed at the same time.

Also, according to the thirteenth and seventeenth inventions according to the present invention, it is made possible to allow for not only the possibility of receiving at each observation point the radio wave sent from the sending point identified by the system ID, but also the possibility of receiving the radio wave sent from each observation point at the sending point identified by the system ID.

BRIEF DESCRIPTION OF THE DRAWINGS

FIG. 16 shows a second format for transferring radio base station information;

FIG. 18 shows a relationship between the observation point ID and the receipt electric power and delay variance;

FIG. 20 shows a signal-to-interference ratio table;

FIG. 23 shows a receipt property determination result table;

FIG. 24 shows evaluation criteria for interference degradation level and receipt possibility;

FIG. 25 shows an example of a relationship between color numbers and colors;

FIG. 28 shows an example of a relationship between color numbers and colors;

FIG. 29 shows an example of a correspondence between communication possibilities comprised of receipt electric power and delay variance and colors;

FIG. 30 shows an example of a correspondence between communication possibilities comprised of receipt possibility and interference degradation level and colors;

FIG. 32 shows a signal-to-interference ratio table associated with sending point CI ratios;

FIG. 33 provides a summary of interference degradation levels obtained based on the total CI ratio and sending point CI ratio;

DETAILED DESCRIPTION OF THE PREFERRED EMBODIMENTS

Figure 1:
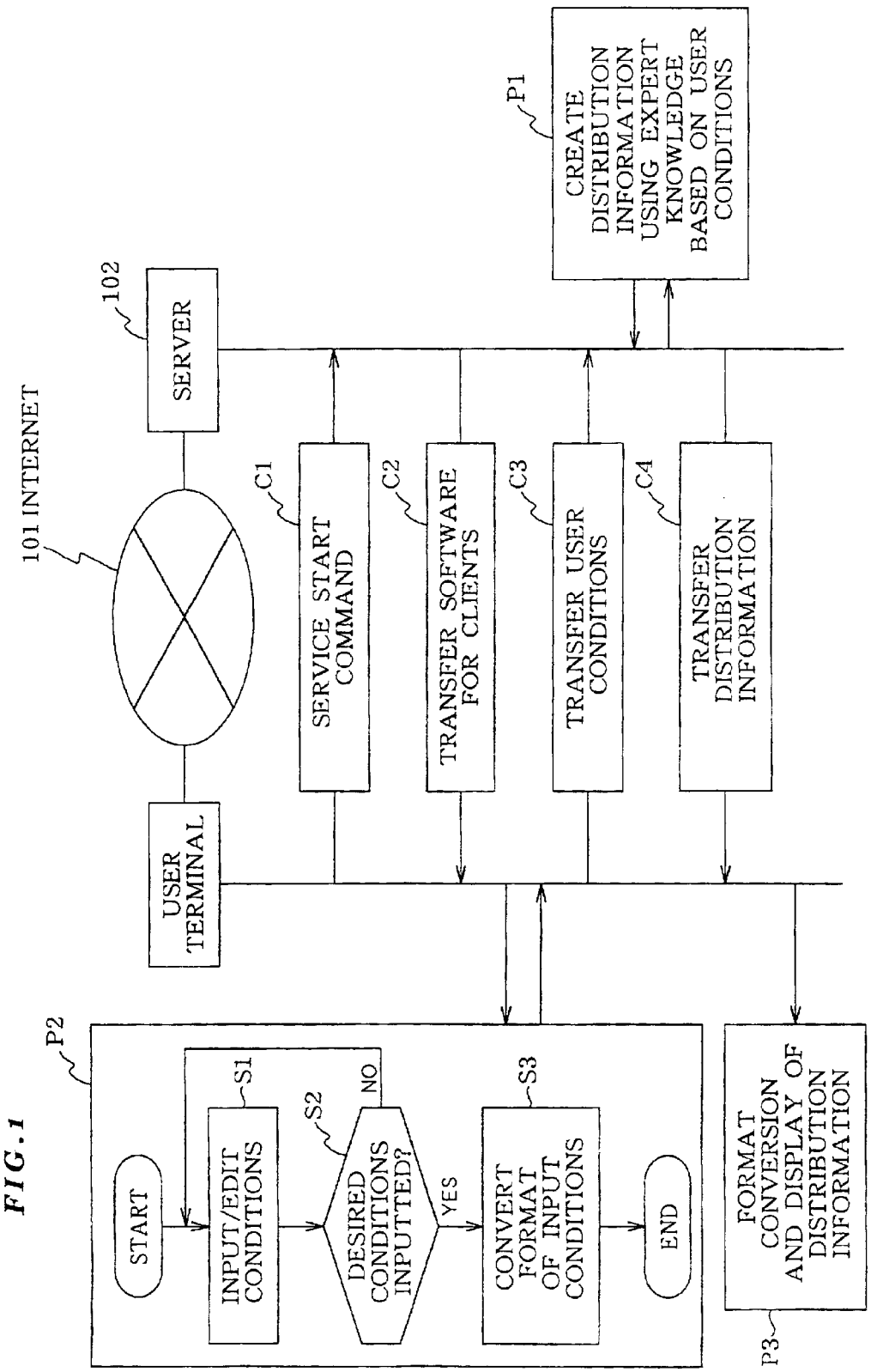
FIG. 1 is a block diagram of a first embodiment of a propagation environment notification system relating to the present invention.

Embodiments of the present invention will be described below, referring to the attached drawings. First, a first embodiment will be described. FIG. 1 is a block diagram of the first embodiment of a propagation environment notification system related to the present invention. In this drawing, reference numerals 100, 101 and 102 denote a user terminal, the Internet and a server, respectively, and the user terminal 100 and the server 102 are connected through the Internet 101.

First, the user terminal 100 sends a service start command C1 to the server 101 to start a service for obtaining required information (radio propagation environment information). Furthermore, user authentication may be performed before the service start command C1 is sent. Then, when receiving this command, the server 102 transfers to the user terminal 100 software for clients for performing processing of obtaining user specific information (user's are a appliance placement information and information of wall position, window position or the like) and radio base station information, processing of converting the specific information and radio base station information into formats capable of being used by processing on the server 102 side, and format conversion and display processing for presenting to the user the distribution information (radio propagation environment information) obtained by the processing on the server 102 side (C2 in the drawing). Here, this embodiment of present invention, needless to say, is applicable for home.

Then, the user terminal 100 starts the transferred software for clients, and executes a user condition input process P2. The user condition input process P2 is comprised of a user condition inputting/editing step S1 of inputting and editing user conditions (user's area appliance placement information, information of wall position, window position or the like, and radio base station information), a condition input completion determining step S2 of making a determination on whether or not user conditions have been inputted correctly, and an input condition format converting process S3 of converting the input conditions into formats capable of being used on the server 100 side.

The user repeats the user condition inputting/editing step S1 and the condition input completion determining step S2 until the conditions can correctly be inputted, and when the conditions can correctly be inputted, the user conditions are subjected to format conversion through the input condition format converting process S3, and are transferred to the server 102 as user conditions (C3 in the drawing). When receiving the user conditions, the server 102 starts a distribution information generating process P1 for generating the information (radio propagation environment information) to be provided to the user using expert knowledge, based on the user conditions.

Then, the information generated through distribution information generating process P1 is transferred to the user terminal 100 (C4 in the drawing), is converted into a format convenient for the user by the software for clients transferred onto the user terminal 100, and is displayed on the user terminal 100 (P3 in the drawing).

In this way, the user terminal 100 makes access to the server 102 through the Internet 101, whereby the user can easily understand radio propagation environment information. Furthermore, although the case of one user terminal 100 has been presented in the first embodiment, the invention is not limited thereto but may be configured with a plurality of user terminals.

Figure 2:
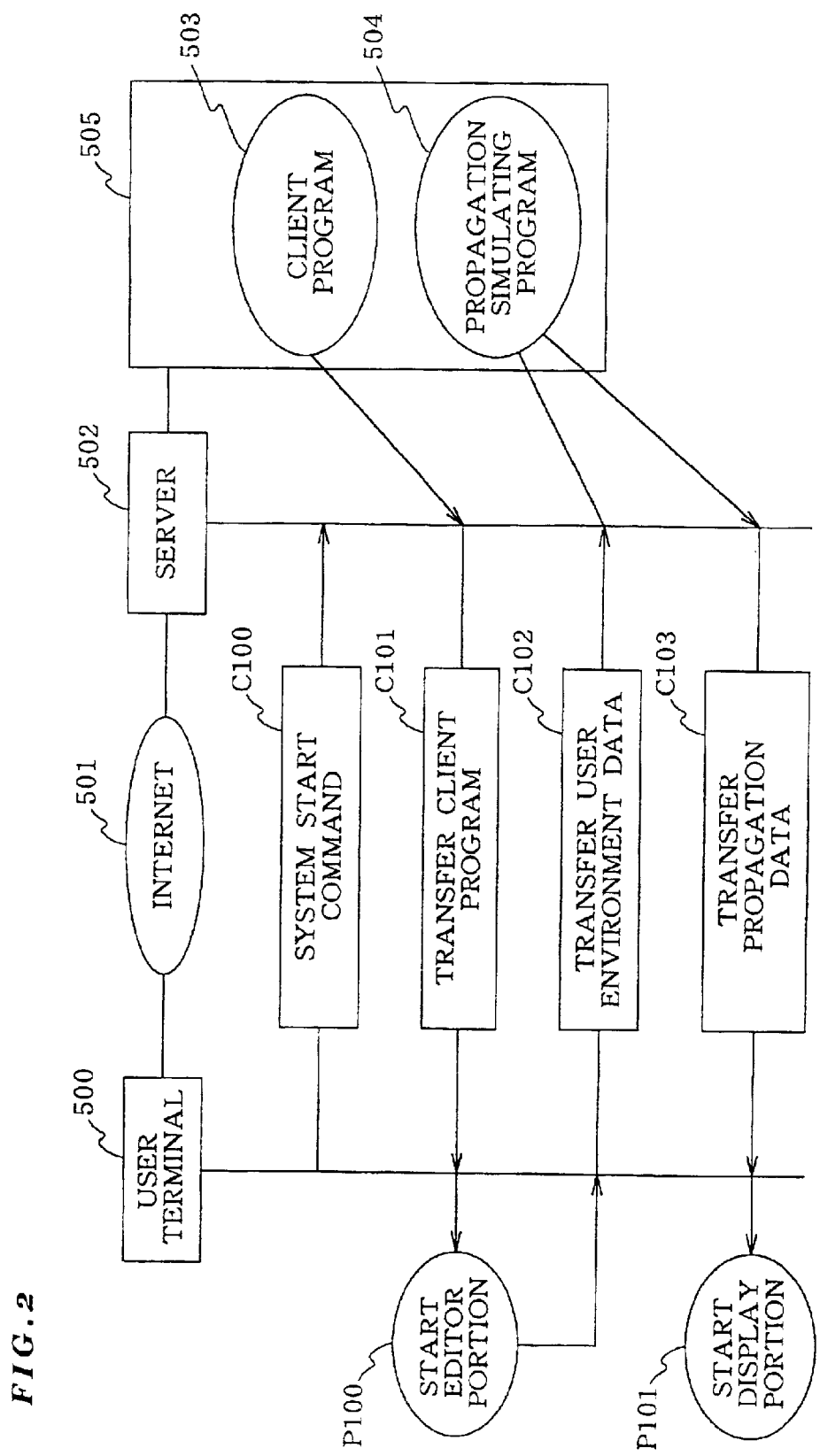
FIG. 2 is a block diagram of a second embodiment.

A second embodiment will now be described. FIG. 2 is a block diagram of the second embodiment. Referring to this drawing, a user terminal 500 is connected to a server 502 through the Internet 501. Furthermore, although in this embodiment, the only one terminal 500 will be shown as a user terminal for simplified explanation, a plurality of terminals may be applied in a similar way. A storage device 505 is connected to the server 502, and a client program 503 for control of the user terminal 500 and a propagation simulating program 504 are stored in the storage device 505.

Operations of the second embodiment will now be described. First, a system start command C100 from the user terminal 500 is transferred to the server 502 via the Internet 501. Furthermore, there may be cases where user authentication is performed by using a password and so on before the system start command C100 is transferred. Then, when receiving the system start command C100, the server 502 transfers to the user terminal 500 the client program 503 for control of the user terminal 500 (Transfer of Client Program C101 in the drawing).

The client program 503 for control of the user terminal is constituted by a editor portion and a display portion. The editor portion has a function of performing format conversion so that appliance placement specific of each user or the like can be inputted from the user terminal 500, and user specific information such as the appliance placement can be inputted in the propagation simulating program 504. Also, the display portion has a function of displaying the result of outputting the propagation simulating program 504 on the user terminal 500 in a form convenient for the user.

Figure 3:
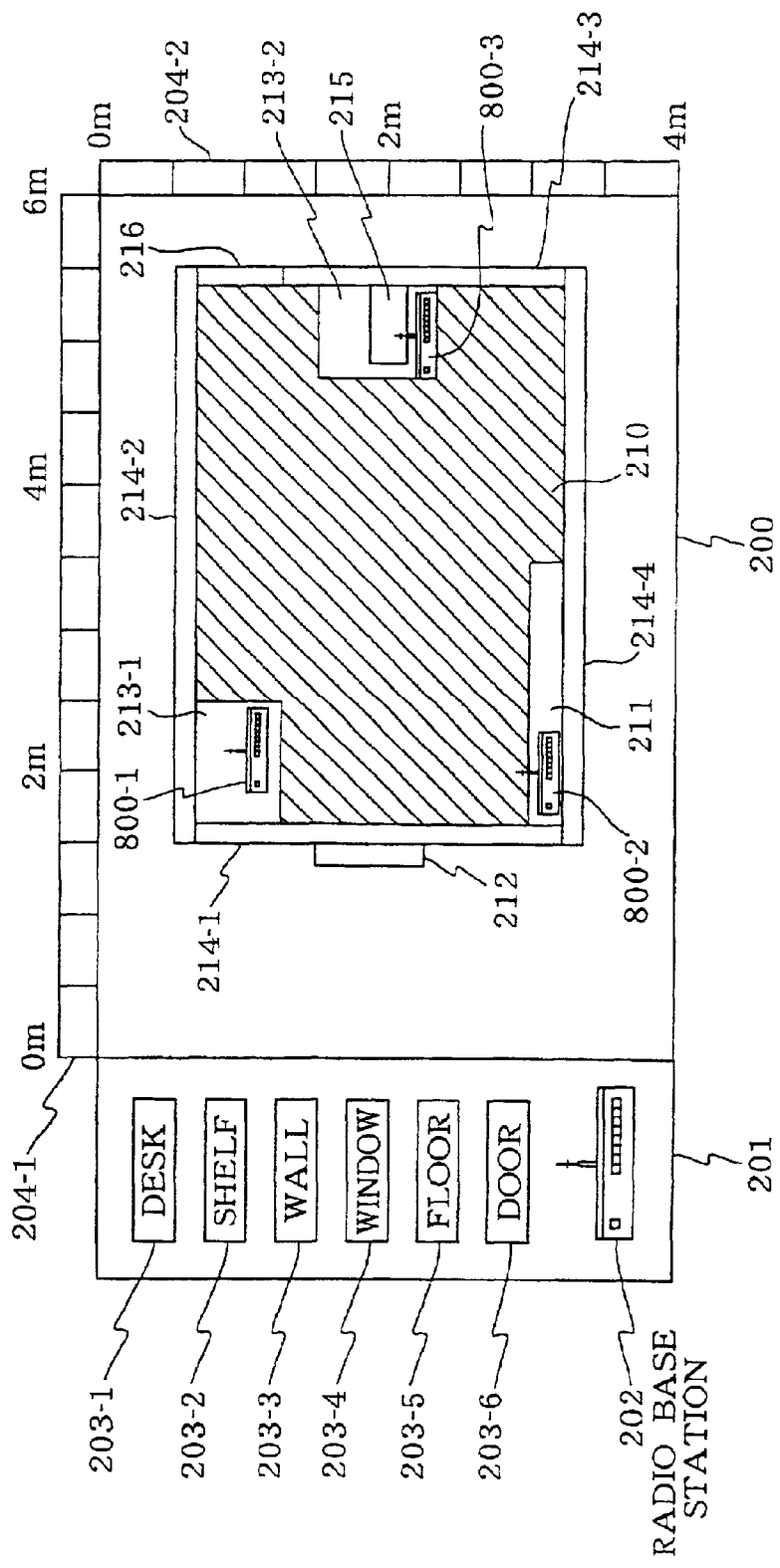
FIG. 3 shows an example of an editor portion of a client program for control of user terminals.

When the client program 503 for control of the user terminal 500 is transferred, the user terminal 500 first starts the editor portion (Start of Editor Portion P100 in the Figure). The editor portion is one shown in FIG. 3, for example. FIG. 3 shows an example of the editor portion of the client program for control of the user terminal. In this Figure, reference numerals 200, 201, 202 and 203-1 to 203-6 denote a user area edition portion, an object display portion, a radio base station object and user objects, respectively.

Here, a desk, a shelf, a wall, a window, a floor and a door are defined for each of user objects 203-1 to 203-6, respectively, but other objects can be used. Also, reference numerals 204-1 and 204-2 denote lateral and longitudinal scales, respectively, and in this embodiment, an area of 6 meter×4 meter is defined as the user area edition portion 200. The user selects an object from the object display portion 201, and places the selected object in the user area edition portion 200 (for example, drags the desk 203-1 with a pointing device such as a mouse to drop it into a predetermined position of the user area edition portion on the screen shown in the drawing), thereby inputting and editing user area information to create user area information.

The example in this drawing shows a room that is surrounded by a floor 210 and walls 214-1 to 214-4, and has a window 212 and a door 216. Desks 213-1 and 213-2 and a shelf 211 are placed in this room. Attributes such as placement, position and material are also inputted for each of these objects. Furthermore, the editor portion divides the object approximately into rectangular parallelepiped parts, and treats each parallelepiped as an independent part.

Figure 4:
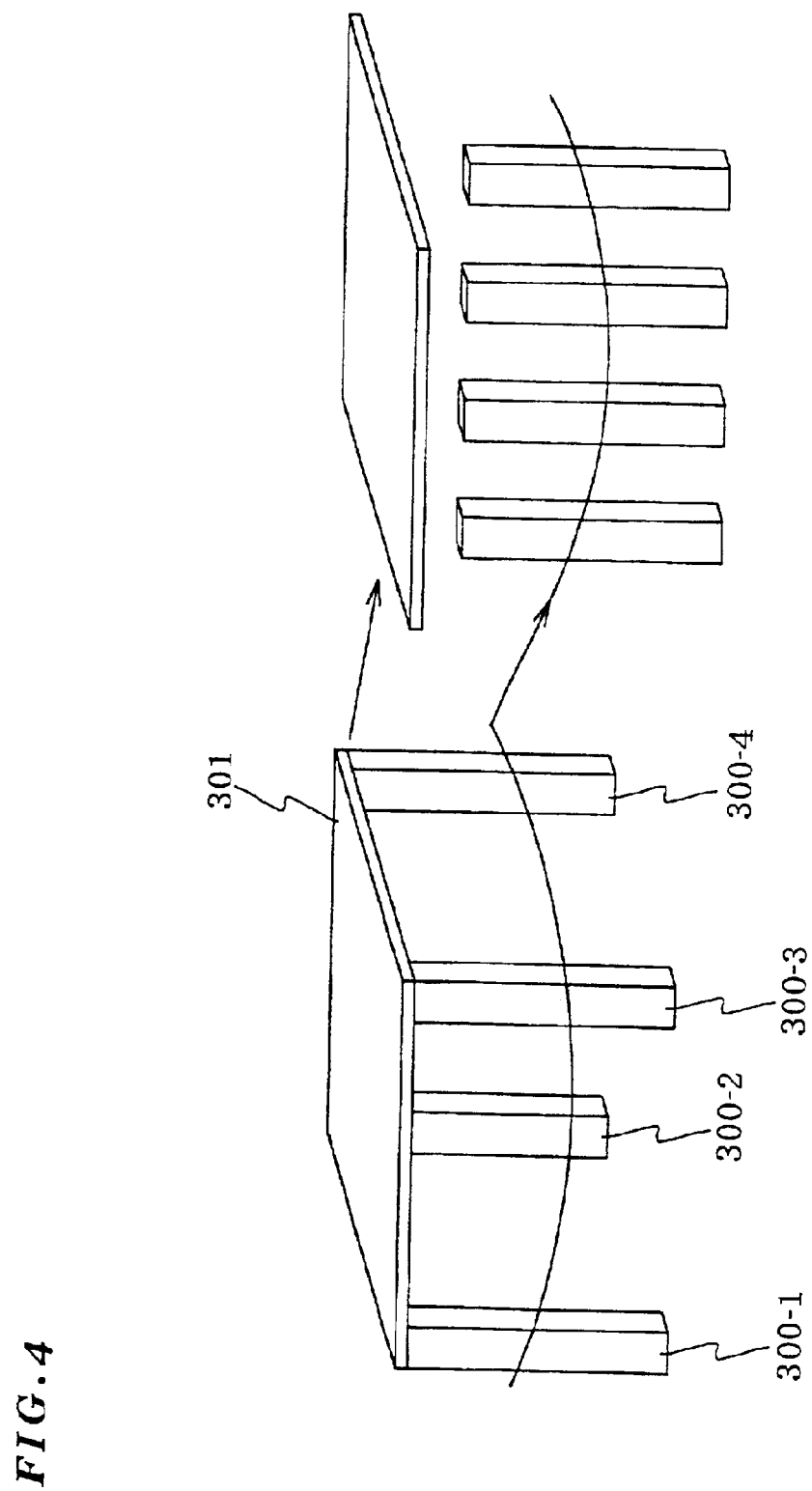
FIG. 4 shows an example of dividing a desk object into parts.
Figures 5, 6, 7:
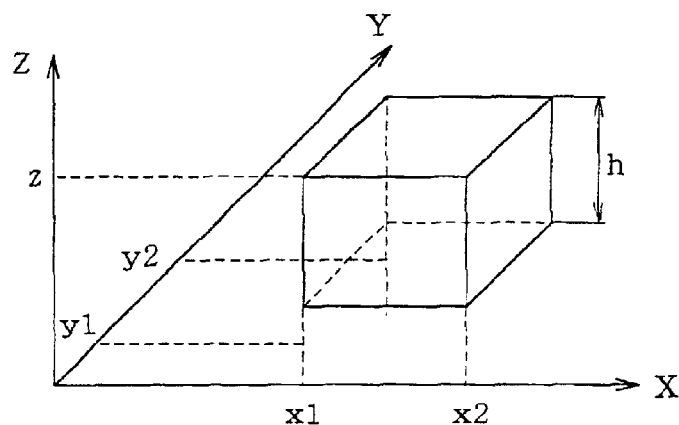
FIG. 5 shows an example of a coordinate system of the part.
FIG. 6 shows an example of a format for transferring user specific information.
FIG. 7 shows an example of a format for transferring radio base station information.

An example thereof is shown in FIG. 4. FIG. 4 shows an example of dividing a desk object into parts. This Figure shows an example of dividing the desk 203-1 into a top 301 and four legs 300-1 to 300-4. For these parts, located positions (lateral direction (X direction in the drawing), longitudinal direction (Y direction in the drawing) and vertical direction (Z direction in the drawing)) are defined by using a coordinate system as shown in FIG. 5, for example. FIG. 5 shows an example of the coordinate system of apart. In this drawing, reference characters $x1$, $x2$, $y1$ and $y2$ denote location coordinates of the part in X and Y directions, reference character z denotes the position of the top surface of the part, and reference character h denotes the height of the part.

Furthermore, each part is converted into data as shown in FIG. 6 showing an example of a format for transferring user specific information, together with the material showing its attribute. Also, the user places the radio base station 202, in addition to placement of individual user objects. In the example in FIG. 3, a radio base station 215 is placed on the desk 213-2. Attributes of the radio base station 215 (radio base station information) include attributes defining transmission of radio waves such as the positions in X, Y and Z directions, the type of antennas and sending electric power, which are inputted by the user as necessary. Attributes other than the position of the radio base station 215 may be predefined. Such radio base station 215 information is converted into data in a form shown in FIG. 7 showing an example of a format for transferring radio base station information. Data converted as shown in FIGS. 6 and 7 are transferred to a server 502 as user environment data, and is inputted in a propagation simulating program 504 that is stored in a storage device 505 (C102 in the drawing).

Furthermore, the server 502 starts the propagation simulating program 504, and simulates the user's area propagation environment, based on the inputted user environment data. In the propagation simulating program 504, when information about the placement of appliances, materials, the position of the radio base station and user's area radio wave transmission is obtained as user environment data, the radio wave propagation properties can be predicted by a ray tracing method described in, for example, John W. McKown and R. Lee Hamilton, Jr., "Ray Tracing as a Design Tool for Radio Networks", IEEE Network Magazine, pp. 27–30, November 1991. In the ray tracing method, the radio wave sent from a sending point is approximated to a plurality of rays to predict a propagation loss in the range of from the sending point to a receiving point and the delayed time of the arriving delayed wave, with consideration given to reflection and refraction of each ray to propagation.

Figure 8:
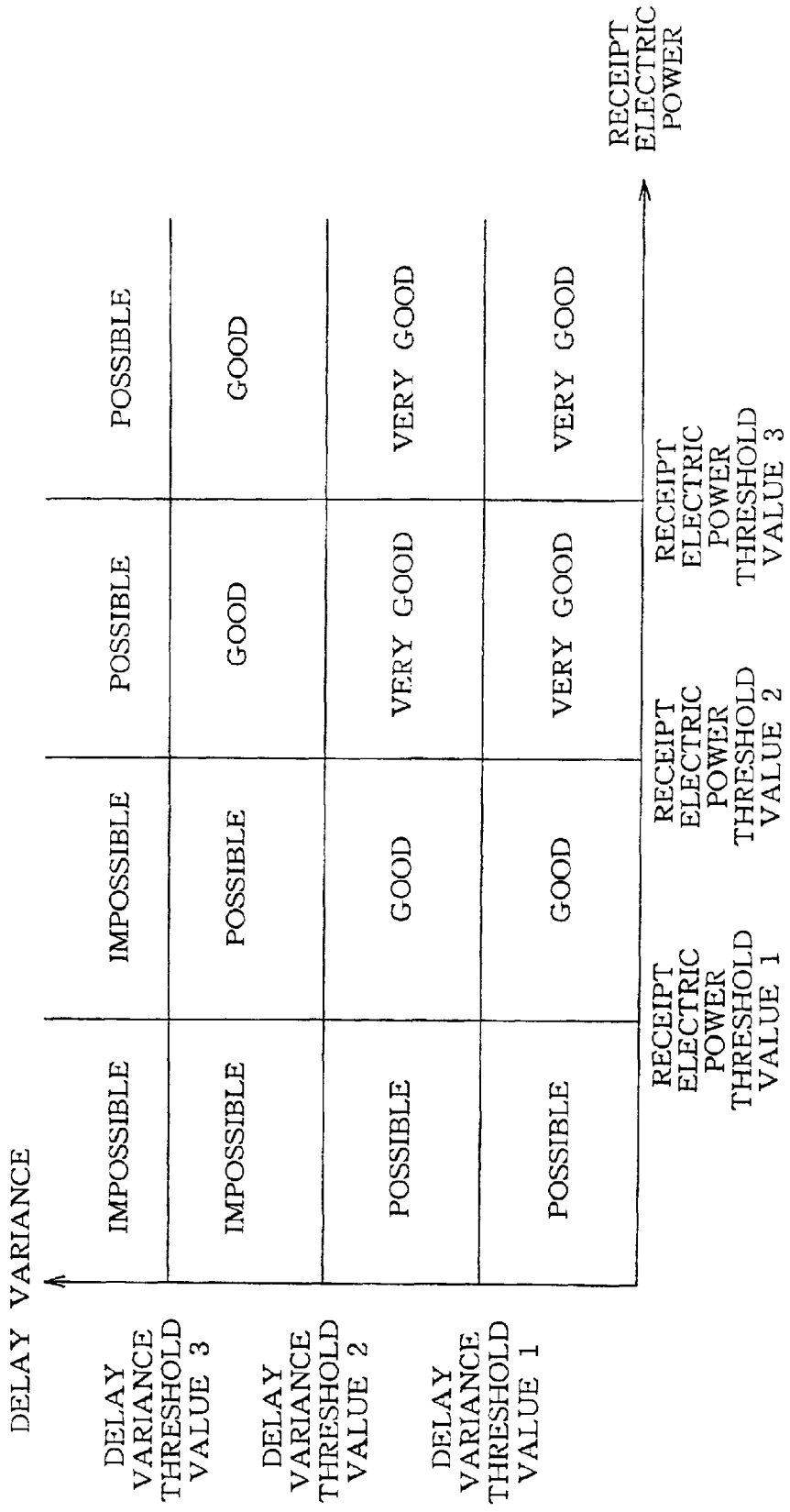
FIG. 8 shows an example of determination criteria for making a determination on a possibility of communication in an observation area.
Figures 9, 10:
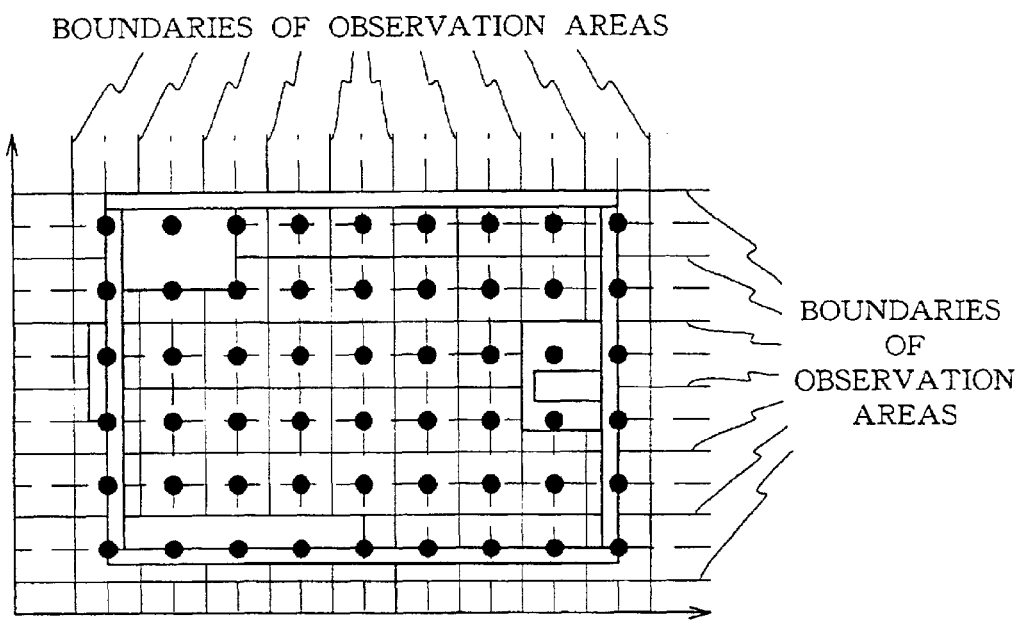
FIG. 9 shows an example of dividing the observation area.
FIG. 10 shows an example of a format for transferring the possibility of communication in each observation area.

In this embodiment, as shown in FIG. 9 showing an example of dividing an observation area, the user's area environment is divided into a plurality of observation areas, rays are generated based on the sending antenna pattern defined in the radio base station, and the receipt electric power and delay variance near the center of each observation area (points indicated with black circles in the drawing), with consideration given to the reflection and refraction by the appliances. That is, the table shown in FIG. 8 is used to map the possibility of communication in each observation area to "very good/good/possible/impossible", from the receipt electric power and delay variance estimated near the center of each observation area. Furthermore, threshold values 1 to 3 in this Figure can be determined by evaluating the properties of a receiver in advance. Also, the number of divided observation areas are increased, thereby enabling more accurate prediction.

Figures 26, 27:
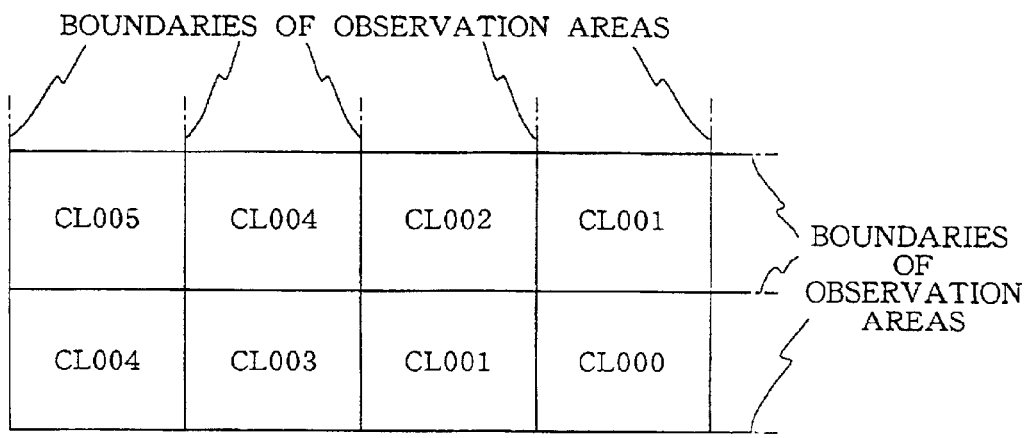
FIG. 26 shows an example of a correspondence between communication possibilities comprised of receipt electric power and delay variance and colors.
FIG. 27 shows an example of coloring each area with a color corresponding to communication possibility.

Furthermore, there are cases where both the properties of the receipt electric power and delay variance are displayed collectively in a visually identifiable form, as a method for notification of communication possibility by evaluation criteria for the receipt electric power and delay variance as shown in FIG. 8. For example, the receipt electric power and delay variance are corresponded to brightness information and chromaticity information, respectively (or the receipt electric power and delay variance are corresponded to chromaticity information and brightness information, respectively). Specifically, the color table in FIG. 26 consisting of colors shown in FIG. 25 is used to express communication possibility. Thereby, the communication possibility consisting of a pair of the receipt electric power and delay variance in each observation area divided as shown in FIG. 9 can be visually identified as shown in FIG. 27. Alternatively, a method can be considered in which the brightness is kept constant and the receipt electric power and delay variance are color-coded by chromaticity and expressed. In this case, the communication possibility is expressed by using the color table in FIG. 29 consisting of colors having the same brightness as shown in FIG. 28.

FIG. 10 shows an example of a format for transferring the communication possibility in each observation area. The information shown in this drawing is transferred from the server 502 to the user terminal 500 as radio propagation environment information. In this Figure, two-dimensional observation are as shown to simplify expression, but division into three-dimensional areas with vertical direction taken into account is also possible. Referring to the Figure, it shows that in the surface at the height of 100 cm above the floor, the communication possibility in the area with the coordinate ($x1$, $x2$, $y1$, $y2$) being (0 cm, 10 cm, 0 cm, 10 cm) is determined as "impossible", the communication possibility in the area with the coordinate being (0 cm, 10 cm, 10 cm, 20 cm) is determined as "possible", the communication possibility with the coordinate being (0 cm, 10 cm, 20 cm, 30 cm) is determined as "good", and the communication possibility with the coordinate being (0 cm, 10 cm, 30 cm, 40 cm) is determined as "very good". Also, in the case where the color table in FIG. 26 or FIG. 29 is used for expression, the color number in FIG. 25 or FIG. 28 corresponding to the receipt electric power and delay variance in each observation area is inputted in the column of communication possibility in FIG. 10.

Figure 11:
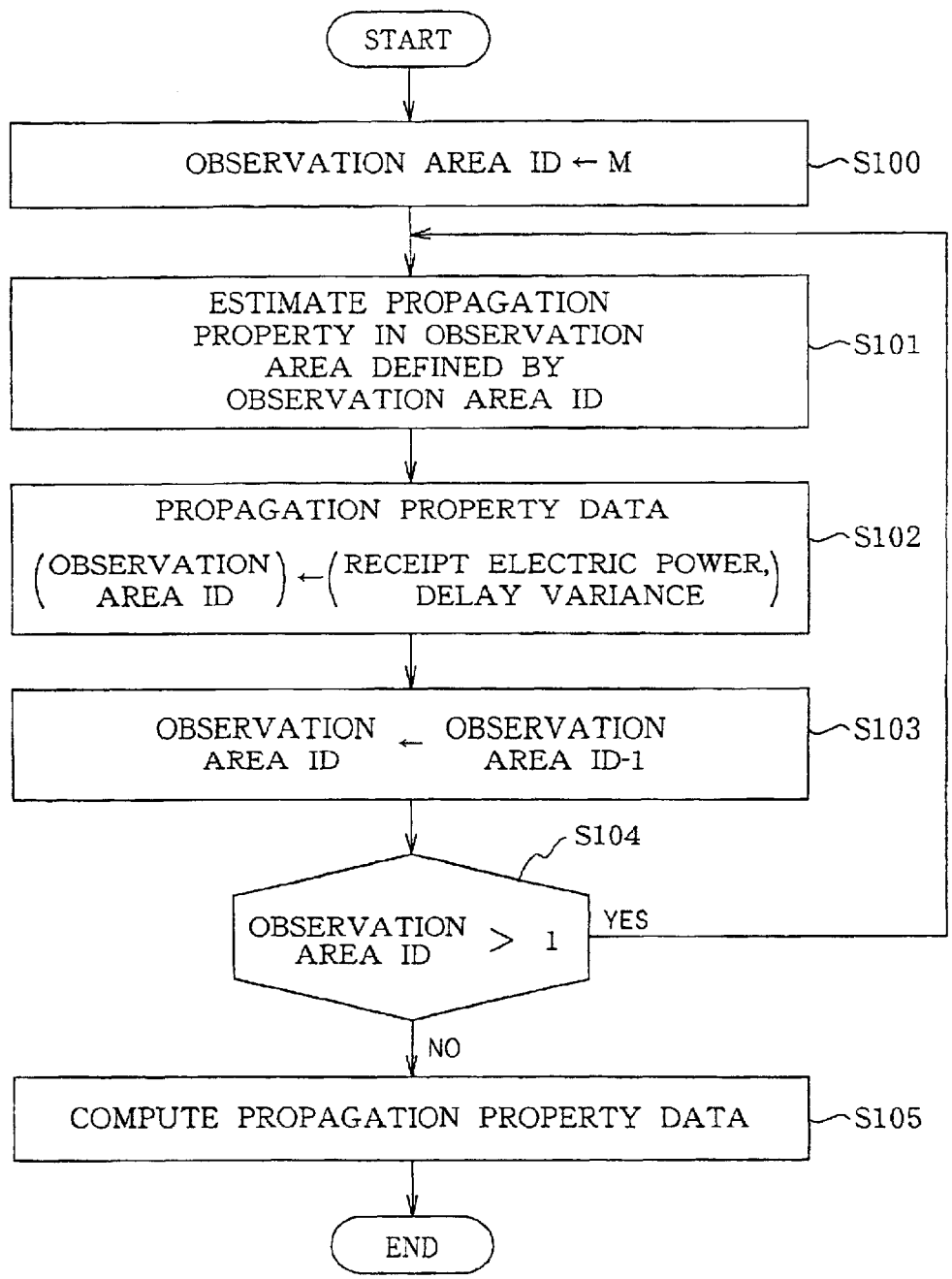
FIG. 11 is a flowchart showing operations of a propagation simulating program 504.

Then, an operation flow of the propagation simulating program 504 in the case where the number of observation areas in the space at the height of 100 cm above the floor is M (M represents a positive integer), and the identification numbers of 1 to M are assigned to respective observation areas is shown in FIG. 11. Referring to the Figure, the number of observation areas M is defined for the observation area ID that is a variable to identify an observation area, in an observation area ID (identifier) initializing step S 100. Then, in a propagation property estimating step S101, tracing is used to estimate a propagation property in the observation area defined by the observation area ID. Then, in a propagation property storing step S102, the receipt electric power and delay variance that are results obtained in the propagation property estimating step S101 are stored in propagation property data having an arrangement with the observation area ID as an index.

Figures 12, 13:
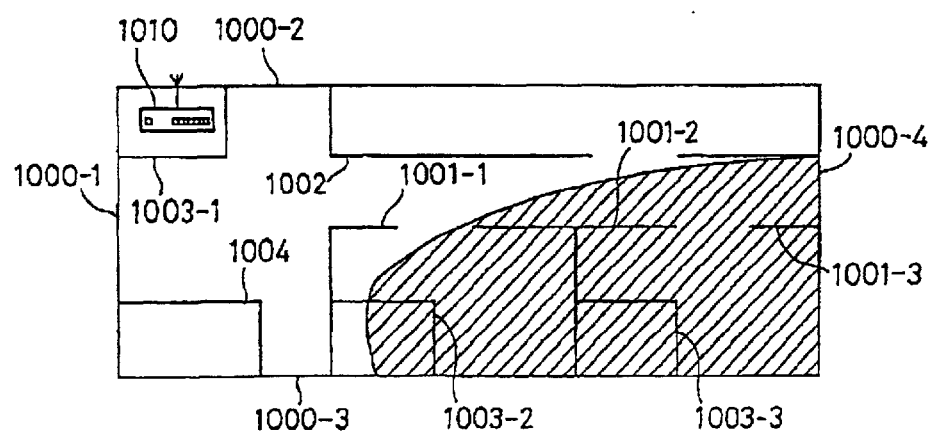
FIG. 12 shows a relationship between the observation area ID and the receipt electric power and delay variance.
FIG. 13 shows a first example showing an area where radio communication is impossible.
Figure 14:
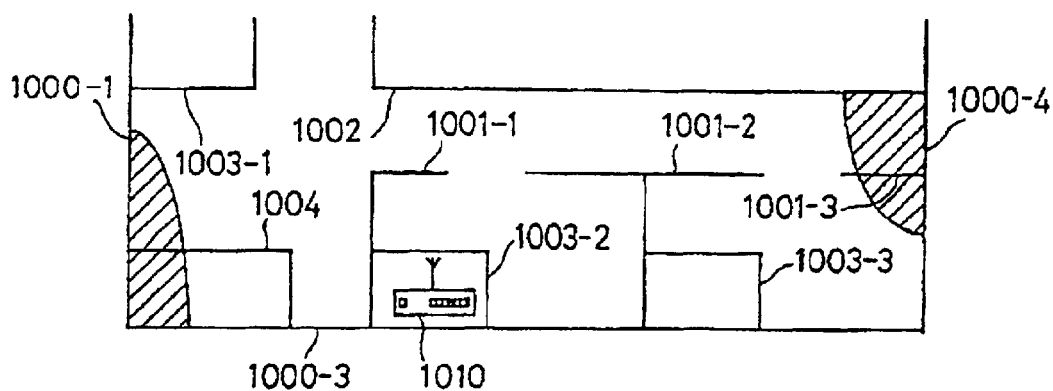
FIG. 14 shows a second example showing an area where radio communication is impossible.

The propagation property consists of the observation area ID and the receipt electric power and delay variance in the observation area defined by the observation area ID, as shown in FIG. 12 showing relationship between the observation area ID and the receipt electric power and delay variance.

Furthermore, 1 is subtracted from the observation area ID in an observation area ID updating step S103, and a determination is made on whether or not the observation area ID is larger than 1 in an observation area ID determining step S104. Then, the propagation property estimating step S101, the propagation property storing step S102 and the observation area ID updating step S103 are repeated if the observation area ID is larger than 1 as a consequent of the determination (in the case of Yes in the step S104), and advancement to a propagation property data computing step S105 is made to make a determination on the possibility of communication in each observation area if the observation area ID is not larger than 1 (in the case of No in the step S104). When this propagation property data computing step S105 is carried out, the receipt electric power and delay variance for every observation area ID is obtained as the propagation property data.

Since in general, the higher the receipt electric power, the better communication property is obtained, and the smaller the delay variance, the better communication property is obtained for relationship between the communication property and the receipt electric power and delay variance, the evaluation criteria for receipt electric power and delay variance as shown in FIG. 8 are applied for propagation property data to make a determination on the possibility of communication in each observation area, in the propagation property data computing step S105.

If receipt electric power threshold values 1 to 3 shown in FIG. 8 are −80 dBm, −70 dBm and −65 dBm, respectively, and delay variance threshold values 1 to 3 are 50 nanoseconds, 100 nanoseconds and 160 nanoseconds, respectively, for example, the possibilities of communication in observation areas identified by observation area IDs of 1 to 5 are "very good", "good", "very good", "impossible" and "possible", respectively.

In this way, the communication possibilities for respective observation areas are summarized in this way in a table as shown in FIG. 10, for example, and are transferred to the user terminal 500 as propagation data, in the propagation property data computing step S105 (See C103 in FIG. 2.). The client program on the user terminal 500 receiving this propagation data starts the display portion to display on the user terminal 500 the possibility of communication in the environment inputted by the user (See P101 in FIG. 2.).

Furthermore, the program of the user condition inputting process P2 shown in the flowchart in FIG. 1 and the propagation simulating program 504 shown in the flowchart in FIG. 11 are recorded in the record medium in advance, and for the user terminal, this program of the user condition inputting process P2 can be read from the record medium to input user conditions in accordance with the program, and for the server, this propagation simulating program 504 can be read from the record medium to generate radio propagation environment information in accordance with the program.

Figure 15:
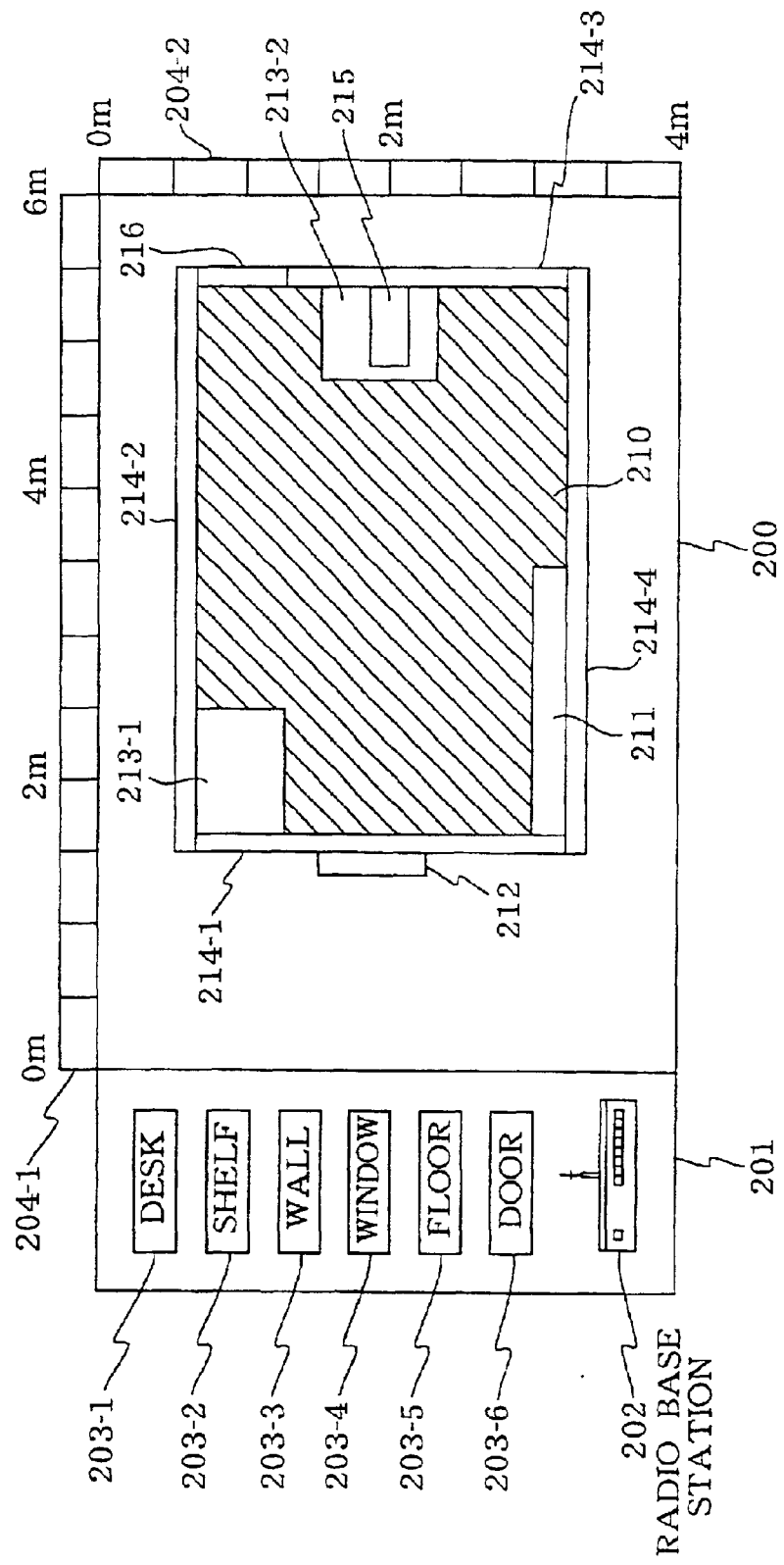
FIG. 15 shows a second example of the editor portion of the client program for control of user terminals.
Figure 17:
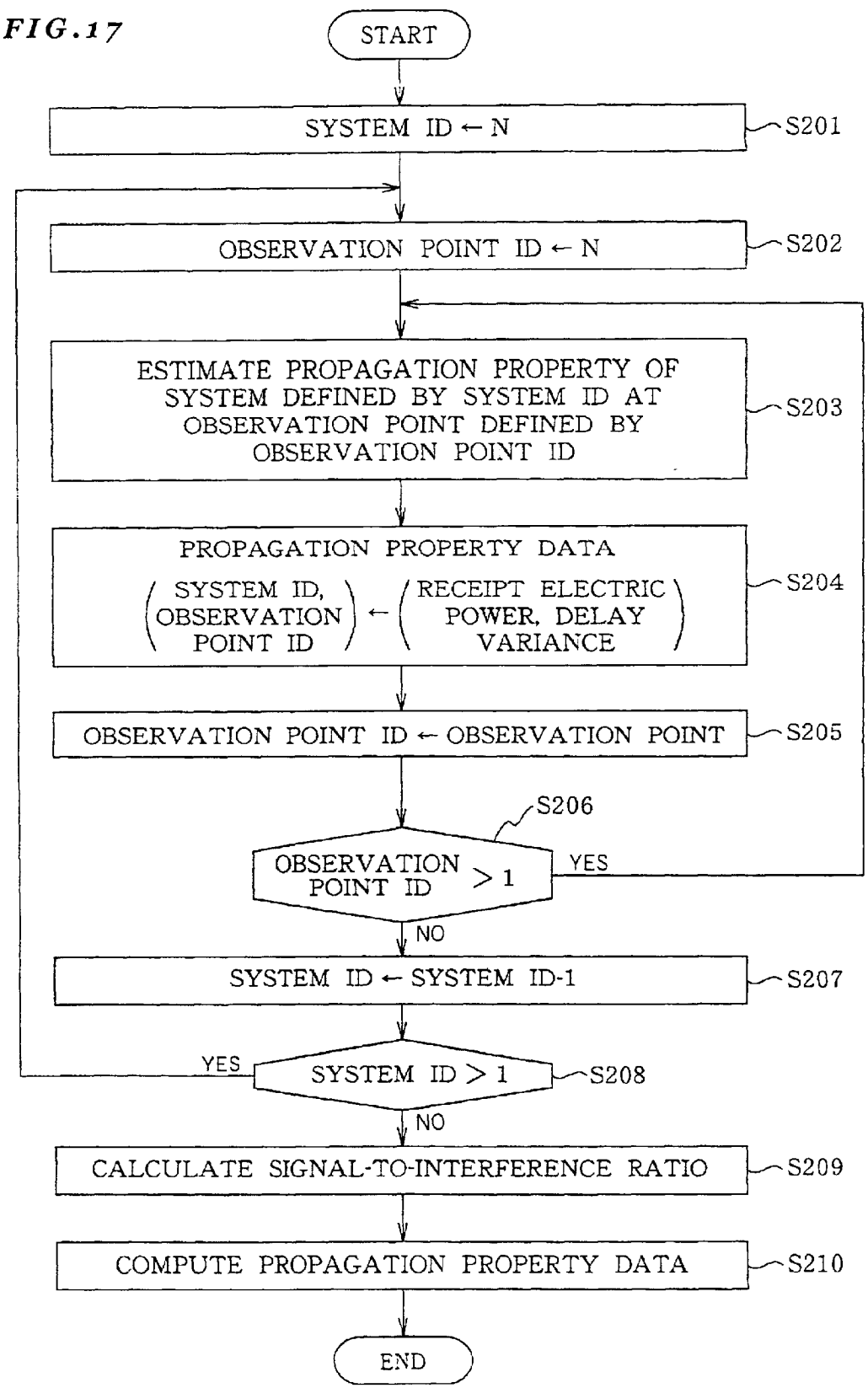
FIG. 17 is a flowchart showing an operation flow of the propagation simulating program 504.

A third embodiment will now be described. The third embodiment represents an example where sending systems such as a plurality of radio base stations and radio interference sources coexist. In the case where sending systems coexist, sending points of respective sending systems are placed in the editor portion of the client program for control of the user terminal shown in FIG. 3, as shown in FIG. 15 showing a second example of the editor portion of the client program for the user terminal. This Figure shows an example where three sending points 800-1, 800-2 and 800-3. Also, the data that is sent to the server from the editor portion of the client program edited as shown in FIG. 15 includes an area for identifying a sending system (the system type in FIG. 16) as shown in FIG. 16 showing an example of a second format for transferring radio base station information. For sending points, not only communication systems such as quick wireless LAN and short range radio systems but also systems such as microwave ovens that are not communication systems but form interference sources emitting radio waves can be described. Also, sending systems are different from one another in this example, but two or more sending systems of a kind may be included. As in the case of the above described example, the number of observation areas in the space at the height of 100 cm above the floor is defined as M (M represents a positive integer), and identification numbers of 1 to M are assigned to respective observation areas. Furthermore, the number of sending points of the system is defined as N (N represents a positive integer), identification numbers of 1 to N are assigned to respective sending points of the system. In that case, the operation flow of the propagation simulating program 504 resembles the operation flow shown in FIG. 17, for example. FIG. 17 is a flowchart showing the operation flow of the propagation simulating program 504.

Referring to this drawing, the number of sending points N of the system is defined for the system ID that is a variable for identifying the sending point of the system of which propagation property is to be estimated, in a system ID initializing step S201. Also, the number of observation areas M is defined for the observation area ID that is a variable for identifying the observation area, in an observation point ID initializing step S202. Then, the propagation property in the observation area defined by the observation area ID is estimated with respect to the radio wave sent from the sending point defined by the system ID, using ray tracing, for example, in a propagation property estimating step S203.

Then, in a propagation property storing step S204, the receipt electric power and delay variance that are the results obtained in the propagation property estimating step S203 are stored in propagation property data having an arrangement with the observation area ID and system ID as indexes. Furthermore, 1 is subtracted from the observation area ID in an observation area ID updating step S205, and a determination is made on whether or not the observation area ID is larger than 1 in an observation area ID determining step S206. Then, the propagation property estimating step S203, the propagation property storing step S204 and the observation area ID updating step S205 are repeated if the observation area ID is larger than 1 (in the case of Yes in the step S206), and estimation as to the radio wave sent from the sending point identified by the system ID is completed if the observation area ID is not larger than 1 (in the case of No in the step S206).

At this time, advancement to a system ID updating step S207 is made to update the system ID (subtract 1 from the system ID) and estimate the propagation environment of the radio wave sent from the next sending point. At this time, the observation ID is initialized thorough the observation point ID initializing step S202, and the propagation property estimating step S203, the propagation property storing step S204 and the observation area ID updating step S205 are repeated in a similar way. The operations are repeated until it is determined by the system ID determining step S208 that the system ID equals 1.

By the above described repeated operations, the estimation of the propagation environments of radio waves sent from sending points identified by all system IDs is completed. At this time, as shown in FIG. 18 showing the relationship between the observation point ID and the receipt electric power and delay variance, estimated values of the receipt electric power and delay variance that are radio propagation properties in the observation area identified by each observation area ID for the radio wave sent from each sending system identified by the system ID is obtained. Thereafter, the signal-to-interference ration is determined in a signal-to-interference ratio calculating step S209, and then advancement to a propagation property data computing step S210 is made to make a determination on the possibility of communication in each observation area.

If there exists any interference, the following aspects should be considered. There may be cases where communication is performed while confirmation of delivery is made between sending and receiving ends, in order to remove the influence of transmission errors. In this case, not only the possibility of receiving in each observation point the radio wave sent from the sending point identified by the system ID but also the possibility of receiving the radio wave sent from each observation point in the sending point identified by the system ID should be taken into consideration. If there exists no interference, it is sufficient to determine the propagation property of the sending point identified by the system ID ∃ each observation point to make a determination on the possibility of communication in each observation point, due to reversibility of radio wave propagation if the frequency is fixed. If there exists interference source, however, the influence of interference is in the sending point identified by the system ID and each observation point is not the same, and thus the two-way receipt possibility of the sending point identified by the system ID ∃ each observation point and of each observation point ∃ the sending point identified by the system ID should be taken into consideration.

Figure 19:
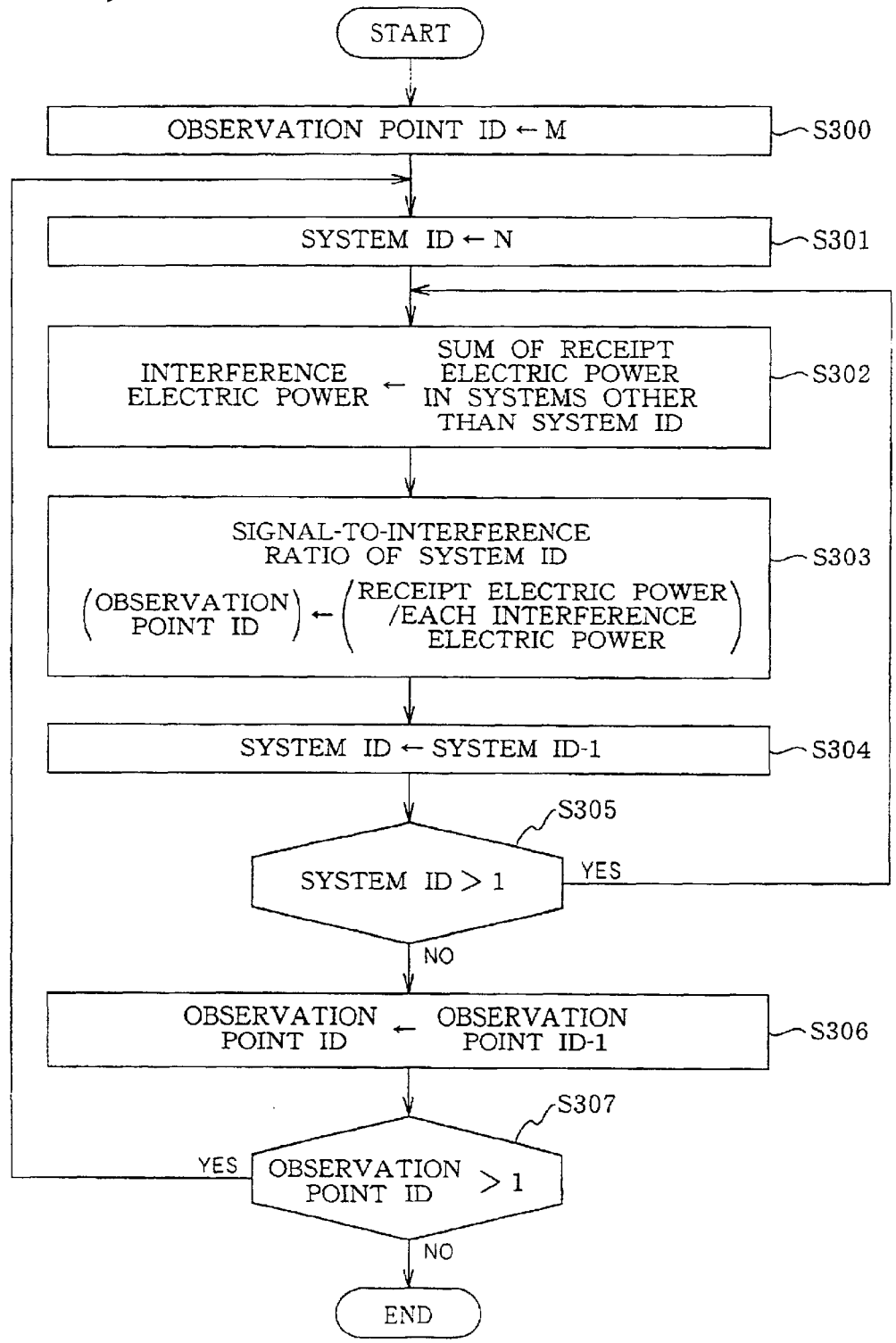
FIG. 19 is a flowchart showing operations of signal-to-interference calculation.

The signal-to-interference ratio calculating step S209 can be achieved by the flow shown in FIG. 19, for example. FIG. 19 is a flowchart showing operations of calculating signal-to-interference ratios in respective observation points, with respect to the possibility of communication for the sending point identified by the system ID ∃ each observation point. Referring to FIG. 19, in an observation point ID initializing step S300, the number of observation points M is defined for the observation point ID that is a variable for identifying an observation area. Furthermore, in a system ID initializing step S301, the number of sending points N is defined for the system ID that is a variable for identifying a sending point. After these initializations are performed, the reference electric power for the sending point defined by the system ID in the observation point defined by the observation ID is computed in an interference electric power computing step S302. For example, this computation, for the reference electric power for the system ID=1 in the observation point ID=1, can be performed by using the result of estimating the propagation environment of radio waves shown in FIG. 18, as described below.

Since the sending points of system IDs 2, 3 form the interference at the time of receiving radio waves from the sending point of system ID=1, the sum (−85 dBm) of the receipt electric power (−88 dBm) from the system ID=2 and the receipt electric power (−8 dBm) from the system ID=3 in the observation point ID=1 equals the total interference electric power in the observation point of ID=1 for the system ID=1. Also, the interference electric power from the system IDs=2, 3 for the system ID=1 are both −88 dBm.

The result of computation in the interference electric power computing step S302 is stored in a signal-to-interference ratio table having an arrangement with the observation point ID and system ID as indexes, in a signal-to-interference ratio storing step S303. In this table, the ratio of the total interference electric power to each system ID (referred to as "total CI ratio) and the CI ratio to individual systems in the observation point ID may also be included.

Now, The total CI ratio will be briefly described. For example, the case where the radio wave from the sending point of system ID=1 is received in the observation point ID=1 will be considered, referring to FIG. 18. As described previously, radio waves from the sending points of system IDs=2 and 3 form interference at the time of receiving the radio wave from the sending point of system ID=1. In this case, the receipt electric power of the radio wave from the sending point of system ID=1 equals −60 dBm. On the other hand, the receipt electric power of the radio wave from the sending point of the system ID=2 equals −88 dBm, and the receipt electric power of the radio wave from the sending point of the system ID=3 also equals −88 dBm. Thus, the sum (−85 dBm) of the receipt electric power of system ID=2 and the receipt electric power of system ID=3 equals the total interference electric power. The ratio (25 dB) of the total interference electric power (−85 dBm) of system IDs 2 and 3 to this receipt electric power (−60 dBm) of system ID=1 equals the total CI ratio.

Then, through an updating step S304, a system ID determining step S305, an observation point ID updating step S306 and an observation point ID determining step S307, the signal-to-interference ratio table is determined for all the observation point IDs and system IDs.

The signal-to-interference ratio table generated in the signal-to interference ratio storing step S303 is a table as shown in FIG. 20, for example. In the case of an example of observation point ID=1 and the system ID=1, since the sum of interference voltage equals −85 dBm as described above, and the receipt electric power from the sending point of system ID=1 equals −60 dBm, the total CI ratio equals 25 dB. Also, since the receipt electric power of individual systems of system IDs=2, 3 relative to the system ID=1 are both −88 dBm, their individual CI ratios are both 28 dB. By using the flow shown in FIG. 19, columns defined by all the observation point IDs and system IDs can be determined is a similar way.

Figure 31:
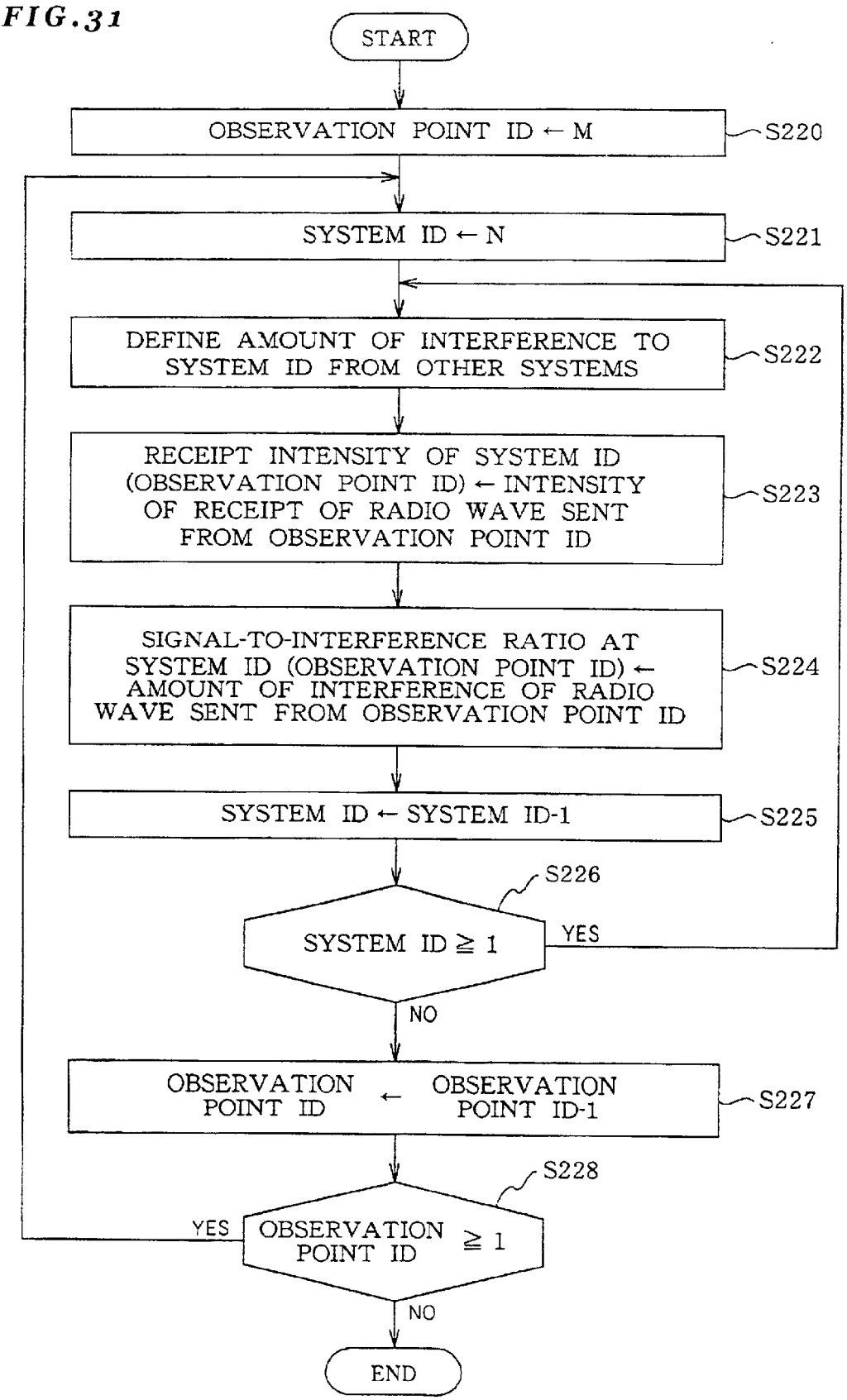
FIG. 31 is a flowchart showing operations of signal-to-interference ratio calculation.
Figure 34:
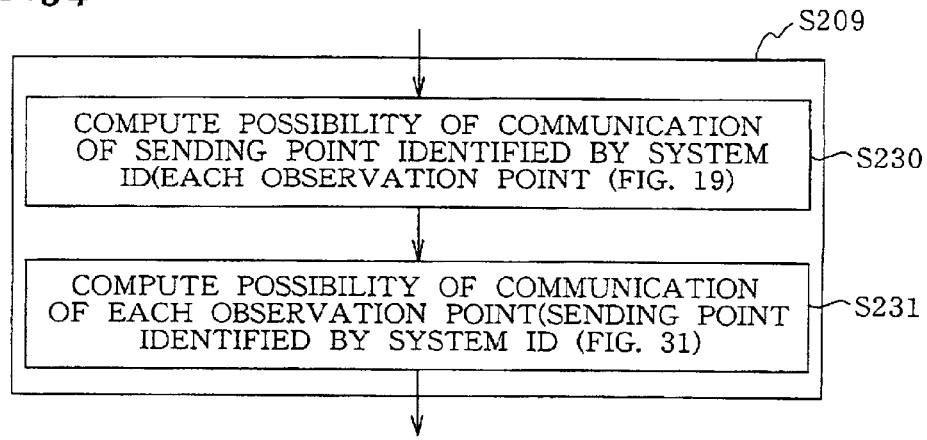
FIG. 34 shows an overview of operations of a signal-to-interference wave ratio calculating step S209.

Furthermore, in the case where the possibility of communication at the sending point identified by each observation point ∃ the system ID is examined, it can be achieved based on, for example, the flow chart shown in FIG. 31, using FIG. 20 obtained from the flow in FIG. 19. The signal-tointerference wave ratio calculating step S209 can be achieved by making a configuration such that a communication possibility computing step S230 for the sending point identified by the system ID ∃ each observation point achieved with the flowchart in FIG. 19 and the communication possibility computing step S321 for each observation point ∃ the sending point identified by the system ID shown in the flowchart in FIG. 31 are executed in series, as shown in FIG. 34. It is also possible to put together these two steps to achieve them as one flow, but for simplification of illustration of operations, the case where the signal-to-interference wave ratio calculating step S209 is achieved with a configuration in which the flowchart shown in FIG. 19 and the flowchart shown in FIG. 31 are executed in series as shown in FIG. 34 will be described here. Operations of the communication possibility computing step S231 for each observation point ∃ the sending point identified by the system ID will be described, referring to FIG. 31. In the observation point ID initializing step S220, the number of observation areas M is defined for the observation point ID that is a variable for identifying an observation area. In the system ID initializing step S 221, the number of sending points N is defined for the system ID that is a variable for identifying a sending point. After these initializations are performed, interference electric power from other system IDs at the sending point identified by the system ID are first defined in a sending point reference amount defining step S222. In a sending point receipt intensity computing step S223, the receipt electric power is determined when the radio wave sent from the terminal communicating with the sending point defined by the system ID from the position defined by the observation ID is received at the sending point defined by the system ID. In a sending point signal-to-interference ratio computing step S224, the signal-to-interference wave ratio when the radio wave sent from the location of the observation point ID is received at the sending point identified by the system ID is determined, based on the result obtained in the sending point interference amount defining step S222 and the sending point receipt intensity computing step S223. Then, through a system ID updating step S225, a system ID determining step S226, an observation point ID updating step S227 and an observation point ID determining step S228, the signal-to-interference wave ratio when the radio wave sent from the location of the observation ID is received at the sending point identified by the system ID is obtained with respect to all the observation point and system IDs.

Operations of the sending point interference amount defining step S222, the sending point receipt intensity computing step S223 and the sending point signal-to-interference ratio computing step S224 in FIG. 31 will be described in detail, using FIG. 20.

In the sending point interference amount defining step S222, interference electric power from sending points identified by other system IDs at the sending point identified by the system ID are determined. In this example, explanation will be presented by using the total interference electric power from sending points identified by other system IDs for simplification, but each interference electric power may be addressed individually. First, which observation point the position in which the sending point identified by the system ID exists corresponds to is ascertained. Furthermore, FIG. 20 is used to read the value of total interference electric power from the column of the observation point ID of the observation point where the sending point identified by the system ID exists, and the value is defined as the interference electric power from sending points identified by other system IDs at the sending point identified by the system ID. For example, when the sending point identified by the system ID=1 exists in the position of the observation point ID=3, the interference electric power from sending points identified by other IDs equals 70 dBm.

In the sending point receipt intensity computing step S223, the electric power when the radio wave sent from the terminal existing in the position defined by the observation point ID is received at the sending point identified by the system ID is determined. Now, assuming that the sending electric power of the sending point identified by the system ID equals TX (system ID) and the sending electric power of the terminal existing in the position defined by the observation point ID equals TX (observation point ID), and from FIG. 20, the receipt electric power when the system ID and the observation point ID are given equals RX, the electric power when the radio wave is received at the sending point identified by the system ID is given by: TX (observation point ID)−(TX (system ID)−RX), if decibel representation is used. In this equation, TX (system ID)−RX represents a propagation loss occurring in the range from the sending point identified by the system ID to the location of the observation point ID. Therefore, the propagation loss is applied to the sending electric power in the observation point ID, whereby the electric power when the radio wave is received at the sending point identified by the system ID can be obtained. In this case, the frequencies of the radio wave sent by the terminal existing in the position defined by the observation point ID and the radio wave sent by the sending point identified by the system ID are the same, and thus advantage is taken of the reversibility of the radio wave. For example, the electric power of the radio wave sent from the terminal existing in the position of observation point ID=5 to the sending point identified by the system ID=1 is calculated in the following way. Here, assume that the sending electric power of the sending point identified by the system ID=1 equals 20 dBm, and the sending electric power of the terminal existing in the position of observation point ID=5 equals 20 dBm. From FIG. 20, the receipt electric power in the case of the system ID=1, and the observation point ID=5 equals −88 dBm, and thus the following equation holds:

20 dBm−(20 dBm+88 dBm)=−88 dBm.

This example shows the case where the sending electric power of the sending point identified by the system ID=1 is identical to the sending electric power of the terminal existing in the position of observation point ID=5, but they may be different from each other.

In the sending point signal-to-interference computing step S224, the ratio between the receive signal electric power and the interference electric power (referred to as "sending point CI ratio) at the sending point identified by the system ID is obtained from the interference electric power (−70 dBm in this example) from the sending point identified by the system ID obtained in the sending point interference amount defining step S222 and the receipt electric power (−88 dBm in this example) at the sending point identified by the system ID when the radio wave is sent from the point defined by the observation point ID obtained in the sending point receipt intensity computing step S 223. In this example, the sending point CI ratio at the sending point identified by the system ID=1 of the radio wave sent from the observation point of observation point ID=5 is −88 dBm−(−70 dBm)=−18 dB.

The result of performing the above described computation for the portion shown by the system ID=1 in FIG. 20 is shown in FIG. 32, as an example of using a total interference electric power. Here, assume that the electric power sent from the sending point of the system ID=1 equals 20 dBm, and the sending electric power of the terminal communicating with the sending point of system ID=1 equals 20 dBm. Furthermore, assume that the sending point of system ID=1 exists in the observation point ID=3. FIG. 32 shows only an example of the system Id=1, but similar computation can be performed for system IDs=2, 3.

Figure 21:
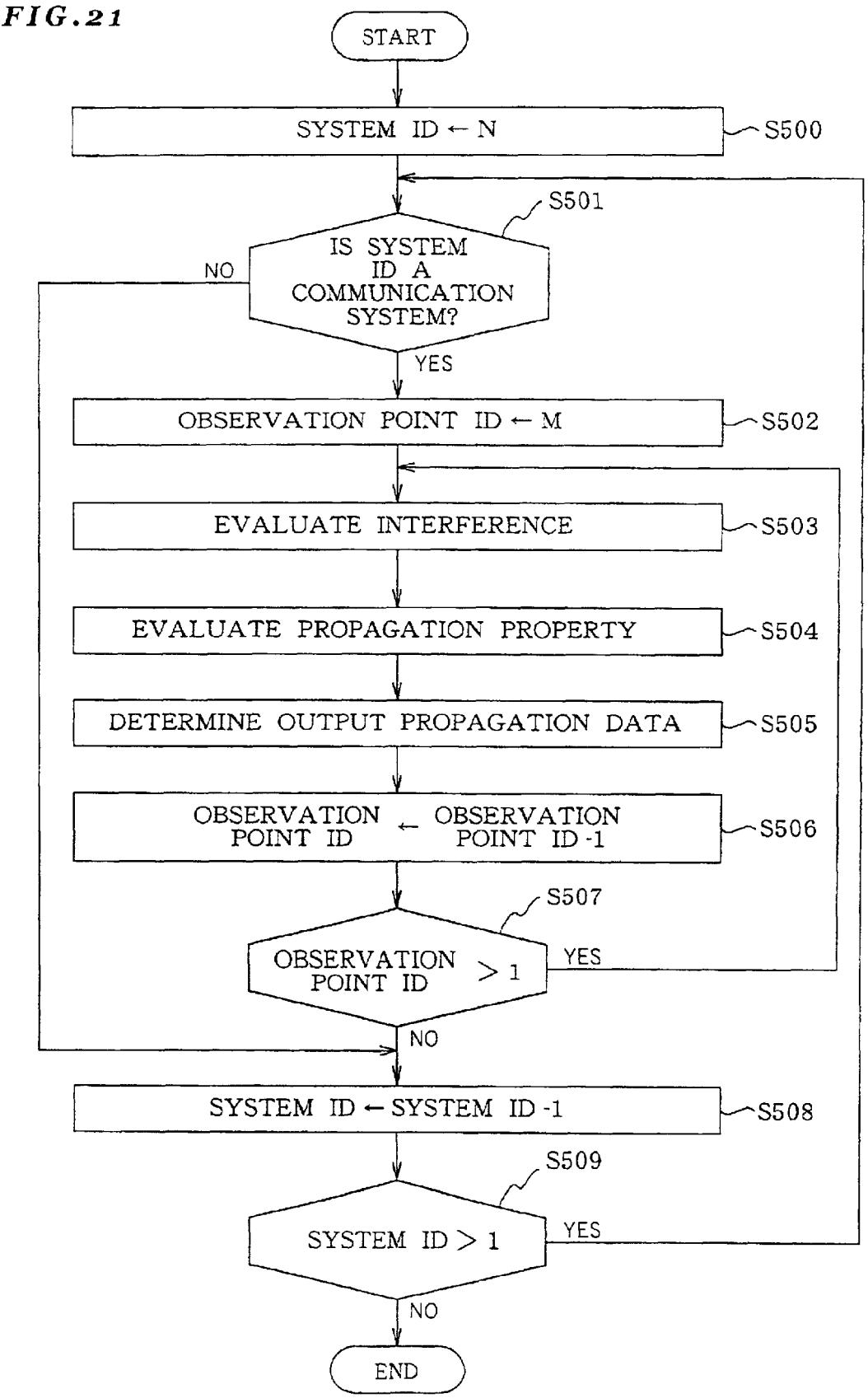
FIG. 21 is a flowchart showing operations of a propagation property data computing step S210.

Also, the propagation property data computing step S210 can be achieved by, for example, the flow in FIG. 21, using the signal-to-interference ratio table in FIG. 20 and the result of estimating propagation properties in FIG. 18. In a system ID initializing step S500, the number of sending points N is substituted for the system ID that is a variable showing a sending point. If the sending system designated by the system ID is an interference source such as a microwave oven, propagation property data to be sent to the user terminal is not required, and thus it is not necessary to perform evaluation thorough an interference evaluating step S503 and a propagation property evaluating step S504. In a system ID determining step S501, a determination is made on whether or not the interference evaluating step S503 and the propagation property evaluating step S504, referring to the sending point designated by the system ID. In an observation point ID initializing step S502, the number of observation areas M is substituted for the observation point ID that is a variable showing each observation area.

First, in the interference degradation evaluating step S503, the receipt quality resulting from interference is estimated. As described above, processing in the case of considering only communication of the sending point identified by the system ID ∃ each observation point is different from that in the case of considering two way communication. First, the case where only communication of the sending point identified by the system ID ∃ each observation point is considered will be described.

Figure 22:
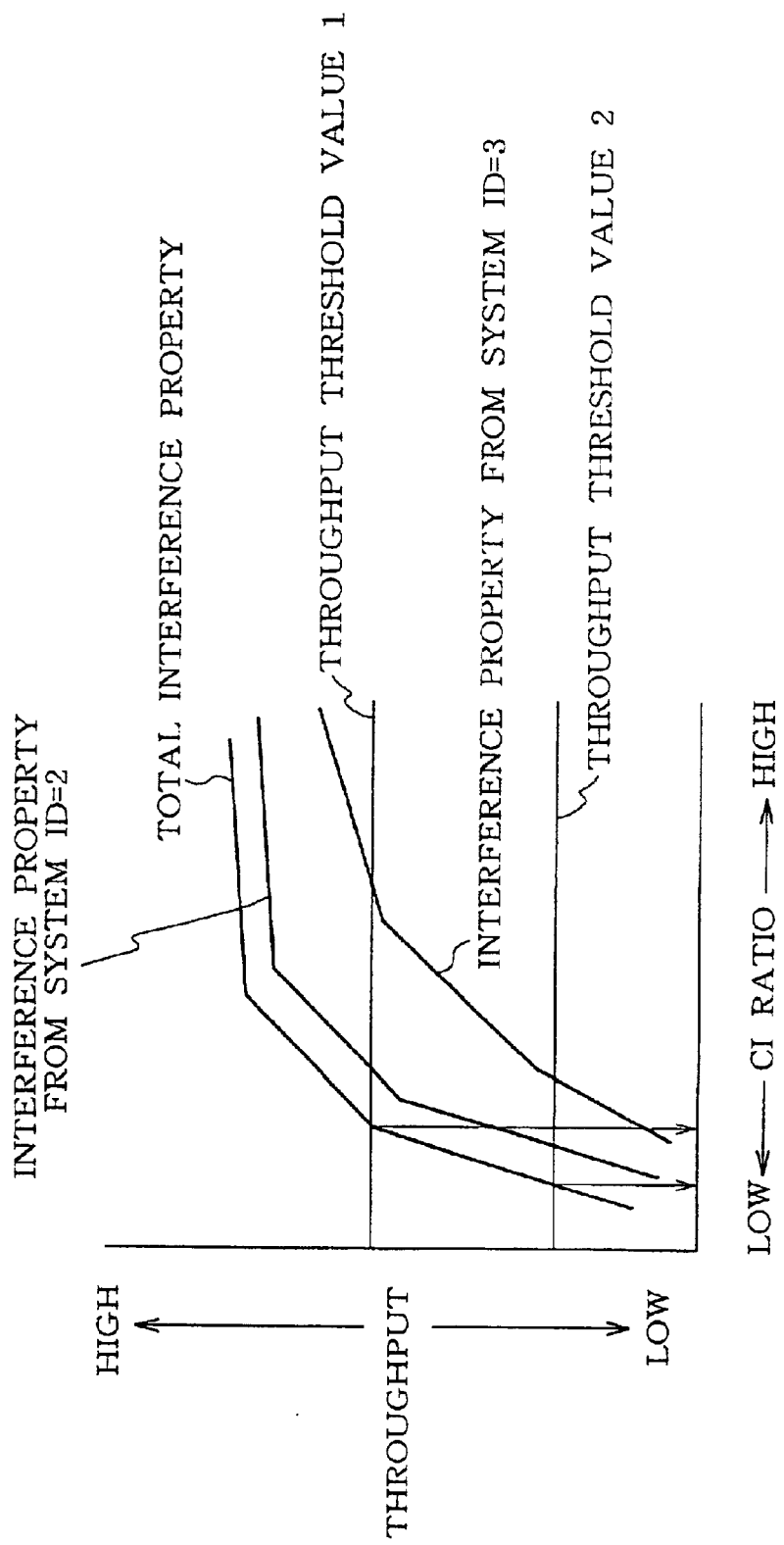
FIG. 22 schematically shows the properties of a throughput versus CI ratio of system ID=1.

In the interference degradation evaluating step S503, the communication quality defined by interference is estimated for the sent signal from the sending point defined by the system ID in the observation area defined by the observation point ID. An example of a communication quality estimating method will be described using the signal-to-interference ratio table shown in FIG. 20 and FIG. 22. FIG. 22 shows properties of throughputs versus CI ratios schematically. The properties depend on modulation demodulation systems and multi-access control, and can be obtained by experiments, theoretical analyses or the like. And generally, as the CI ratio increases, the influence of interference is reduced and the higher throughput can be obtained. Throughput threshold values 1 and 2 are threshold values defining degradation levels of throughputs by CI ratios, wherein (1) a range of CI ratios in which throughputs larger than the throughput threshold value 1 are obtained are defined as interference degradation level: low, (2) a range of CI ratios in which throughputs between the throughput threshold value 1 and the throughput threshold value 2 are obtained are defined as interference degradation level: middle, and (3) a range of CI ratios in which only throughputs smaller than the throughput threshold value 2 are obtained are defined as interference degradation level: high.

For example, the interference degradation level can be defined from the relationship between the total CI ration in FIG. 20 and the throughput threshold values 1 and 2. Also, referring to individual CI ratios, the interference degradation level can be defined from the relationship between the individual CI ratio from the sending point defined by the system ID with the largest influence (for example, with the smallest individual CI ratio) and the throughput threshold values 1 and 2. Also, the interference degradation level for each system ID can be defined through the throughput threshold values 1 and 2 relative to the individual CI ratio.

As a specific example, if total CI ratios giving the throughput threshold values 1 and 2 for the system ID=1 are 20 dB and 10 dB, respectively, in the case where total CI ratios are used, the interference degradation levels for observation point IDs=1 to 5 are "low", "low", "high", "middle" and"high", respectively (the total CI ratio of system ID=1 in FIG. 20).

Also, if tow-way communication between the sending point identified by the system ID and each observation point is considered, not only evaluation based on FIG. 20 but also evaluation based on FIG. 32 should be performed. The total CI ratio shown in FIG. 20 is a signal-to-interference wave electric power ratio at each observation point, the sending point CI ratio shown in FIG. 32 is a signal-to-interference wave electric power at the sending point identified by the system ID. This difference is due to no more than the fact that different apparatuses are covered, and symmetric relation is kept physically, thus allowing the interference degradation level to be determined using the throughput threshold values 1 and 2 shown in FIG. 22. Referring to the sending point CI ratio in FIG. 32, it can be understood that the interference degradation levels for observation points of IDs=1 to 5 are "middle", "high", "high", "high" and "high", respectively.

FIG. 33 provides a summary of interference degradation levels at observation points of ID=1 to 5 based on the total CI ratio and the sending point CI ratio. If two-way communication is considered, the communication quality is defined by the total CI ratio or the sending point CI ratio, whichever the ratio of higher interference degradation level. In this example, it can be understood that since the interference degradation level by the sending point CI ratio is higher than that by the total CI ratio, the communication quality is governed by the sending point CI ratio. In this way, in the case of two-way communication, the interference degradation level at each observation point is outputted based on the total CI ratio shown in FIG. 20 or the sending CI ratio shown in FIG. 32, whichever smaller, whereby the interference degradation level for two-way communication is indicated. Also, the interference degradation level obtained based on the total CI ratio shown in FIG. 20 shows an interference degradation level for one-way communication of the sending point identifiable by the system ID ∃ each observation point. Also, the interference degradation level obtained based on the sending point CI ratio shown in FIG. 32 shows an interference degradation level for one-way communication of each observation point ∃ the sending point identifiable by the system ID.

Figure 35:
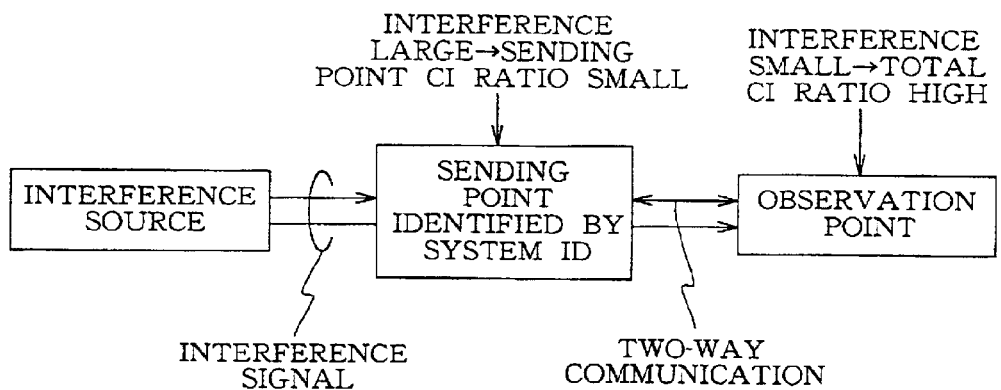
FIG. 35 shows a situation in which it is likely that the sending point CI ratio is smaller than the total CI ratio.
Figure 36:
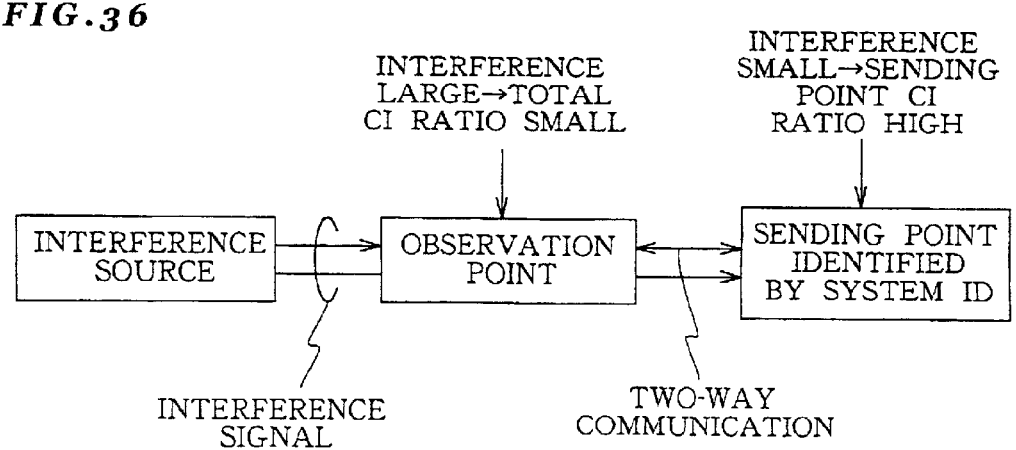
FIG. 36 shows a situation in which it is likely that the sending point CI ratio is larger than the total CI ratio.

The interference degradation level by the total CI ratio and the sending point CI ratio generally tends to depend on physical positional relationship among the sending point identified by the system ID, the interference source and the observation point. As shown in FIG. 35, for example, if the interference source and the observation point are present with the sending point identified by the system ID being located therebetween, it is likely that the sending point identified by the system ID is influenced by interference more strongly than the observation point, and the sending point CI ratio is smaller than the total CI ratio (larger influence of interference). On the other hand, as shown in FIG. 36, if the interference source and the sending point identified by the system ID are presented with the observation point being located therebetween, the observation point is influenced by interference more strongly than the sending point identified by the system ID, and the total CI ratio is smaller than the sending point CI ratio (larger influence of interference). This is an example of simple one-dimensional space, and in the case of an actual three-dimensional space where appliances are placed, the relationship between the sending point CI ratio and the total CI point is not defined merely by the physical positional relationship among the sending point, the interference source and the observation point, due to influences of reflection or the like.

In this way, in the interference degradation evaluation step S503, all or part of:
(1) the interference degradation level for communication to each observation point from the sending point identified by the system ID;
(2) the interference degradation level for communication from each observation point to the sending point identified by the system ID; and
(3) the interference degradation level when two-way communication is performed between each observation point and the sending point identified by the system ID can be outputted.

Furthermore, in the propagation property evaluating step S504, communication possibility (also referred to as receipt possibility) is evaluated, based on the estimated values of receipt electric power and delay variance of the radio wave sent from the sending point defined by the system ID in the observation area defined by the observation point ID. An example of operations in this step will be described, using, for example, the propagation estimation result table in FIG. 18 and the criteria for determination of the receipt electric power and delay variance in FIG. 8. If the threshold values of receipt electric power 1 to 3 are −80 dBm, −70 dBm and −65 dBm, respectively, and the threshold values of delay variance 1 to 3 are 50 nanoseconds, 100 nanoseconds and 160 nanoseconds, respectively, the possibilities of receipt in the observation areas identified by observation area IDs 1 to 5 for the system ID=1 are "very good", "good", "very good", "impossible" and "possible", respectively.

In a receipt property determining step S505, a receipt property determination result table as shown in FIG. 23 is prepared, based on the interference degradation level and receipt possibility obtained through the above described interference degradation evaluating step S503 and propagation property evaluating step S504 and is transferred to the user terminal 500 as propagation data (See C103 in FIG. 2.). The receipt possibility in propagation data can be determined for each observation area for each system ID, using, for example, evaluation criteria (A, B, C and D in descending order) for the interference degradation level and receipt possibility as shown in FIG. 24. The client program on the user terminal 500 receiving this propagation data starts the display portion to display on the user terminal 500 the possibility of communication in the environment inputted by the user (See P101 in FIG. 2.).

Also, the communication possibility can be expressed by using a color table shown in FIG. 30 constituted by colors shown in FIG. 25, for example, in stead of showing the communication possibility in such a manner as to put together the interference degradation level and receipt possibility as shown in FIG. 24. That is, the both properties of interference degradation level and receipt possibility are displayed collectively in such a manner that they are visually identifiable. For example, the interference degradation level and the receipt possibility are corresponded to brightness information and chromaticity information, respectively (or the interference degradation level and the receipt possibility are corresponded to chromaticity information and brightness information, respectively). Alternatively, a method can also be considered in which brightness is kept constant, and the receipt electric power and delay variance are color-coded by chromaticity and expressed. If such expression is used, both properties of receipt possibility and interference degradation level can be expressed at a time such that they are visually identifiable. In this case, the corresponding one of color numbers shown in FIG. 25 is placed in each column of communication possibility in FIG. 23.

According to the first invention according to the present invention, the propagation environment notification method in a radio communication system constituted by a radio base station and a radio terminal comprises a first step of sending conditions about the user's area layout from a user terminal to a server via a communication line, a second step of generating the above described user's area radio propagation environment information based on the above described conditions by the above described server receiving the above described conditions, and a third step of sending the above described radio propagation environment information from the above described server to the above described user terminal via the communication line, thus enabling the user himself to easily understand the radio propagation environment information.

Specifically, the present invention enables a solution for each user to be provided easily based on general user specific conditions. That is, a program is supplied from the server side to obtain user specific information, whereby no burden is put on the user. For the placement of a station in a radio system, for example, optimum station placement information can easily be provided for an individual user, without installing special software in the user terminal for radio wave propagation that varies depending on user's usage environments. Also, the second to five inventions have effects similar to those of the first invention described above.

Also, according to the sixth invention according to the present invention, in the propagation environment notification method in a radio communication system constituted by radio base station and a radio terminal, the above described radio base station is configured as a plurality of radio base stations, and the above described second step comprises a fifty-first step of estimating a propagation environment for a radio wave emitted from each of the above described plurality of radio base stations in the above described user's area layout to generate individual radio wave propagation environment information, a fifty-second step of using the above described individual radio wave propagation environment information to calculate a signal-to-interference ratio expressed by the ratio between the receipt electric power from the targeted above described radio base stations and the receipt electric power from the non-targeted above described radio base stations, and a fifty-third step of generating the above described radio propagation environment information for estimating the possibility of communication in the above described user's area layout, based on the above described individual radio wave propagation environment information and the above described signal-to-interference ratio, thus making it possible to obtain radio propagation environment information allowing for mutual interference even when there exist a plurality of radio base stations and other radio wave emission sources. In addition, the radio propagation environment can be obtained correctly even when communication is performed while delivery confirmation is made.

Also, the seventh and tenth inventions have effects similar to those of the above described sixth invention described above.

Also, according the eleventh and twelfth inventions according to the present invention, it is made possible to differentiate two conditions such as receipt electric power and delay variance or interference degradation level and receipt possibility by color difference using brightness information and chromaticity information, and express them at a time. Thus, the user can easily obtain radio propagation environment information without performing works such as dual-side switching.

Also, according to the thirteenth invention according to the present invention, the above described fifty-second step comprises a sixty-sixth step for computing the receipt electric power from non-the targeted above described radio base stations at positions in which the targeted above described radio base stations are placed, as the interference electric power in targeted base stations, and a sixty-seventh step for computing the ratio between the receipt electric power when the targeted above described radio base stations receive radio waves sent from respective observation points and the interference electric power in the targeted above described base stations (signal-to-interference ratio), thus making it possible to allow for not only the possibility of receiving the radio wave sent from the sending point identified by the system ID at each observation point, but also the possibility of receiving the radio wave sent from each observation point at the sending point identified by the system ID.

Also, the fourteenth to seventeenth inventions have effects similar to those of the thirteenth invention described above. The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2000-198057 (Filed on Jun. 30th, 2000), No. 2000-304293 (Filed on Oct. 4th, 2000), No. 2000-322072 (Filed on Oct. 23rd, 2000), No. 2001-057579 (Filed on Mar. 2nd, 2001) including specification, claims, drawings and summary are incorporated herein by reference in its entirety.

What is claimed is:

1. A propagation environment notification method in a radio communication system constituted by a radio base station and a radio terminal, comprising:

a first step of sending conditions about a user's area layout from a user terminal to a server via a communication line;

a second step of generating said user's area radio propagation environment information based on said conditions by said server receiving said conditions; and a third step of sending said radio propagation environment information from said server to said user terminal via the communication line;

wherein said first step comprises; sending a service start command from said user terminal to said server;

sending software for clients of predetermined form to said user terminal from said server receiving said service start command;

of inputting said conditions from said user terminal based on said software for clients; and sending said conditions from said user terminal to said server;

wherein inputting said conditions is comprised of:

performing input and editing of user conditions (said user's area appliance placement information and said radio base station information);

making a determination on whether or not said user's conditions are correctly inputted;

making a determination on completion of said input of conditions, and converting said input conditions into formats capable of being used on said server's part.

2. The propagation environment notification method in a radio communication system according to claim 1, wherein said step of performing input and editing of user conditions comprises:

dividing the appliance in said appliance placement information into predetermined shapes; and generating information of the position of said divided appliance.

3. The propagation environment notification method in a radio communication system according to claim 2, wherein said position information is three-dimensional information.

4. The propagation environment notification method in a radio communication system according to claim 1, wherein in said input and editing of user conditions step, information of the position in which said radio base station is placed, information of antenna types and information of sending electric power are inputted as said radio base station information.

5. A propagation environment notification method in a radio communication system constituted by a radio base station and a radio terminal, comprising:

a first step of sending conditions about a user's area layout from a user terminal to a server via a communication line;

a second step of generating said user's area radio propagation environment information based on said conditions by said server receiving said conditions; and a third step of sending said radio propagation environment information from said server to said user terminal via the communication line;

wherein said first step comprises: sending a service start command from said user terminal to said server;

sending software for clients of predetermined form to said user terminal from said server receiving said service start command;

of inputting said conditions from said user terminal based on said software for clients; and sending said conditions from said user terminal to said server.

wherein said software for clients comprises:

processing of obtaining said conditions;

processing of converting said conditions into formats capable of being used in processing on said server's part; and format conversion and display processing for presenting to the user said radio propagation environment information obtained through the processing on said server's part;

wherein said software for clients comprises:

an editor portion for said processing of obtaining conditions; and a display portion for said display processing;

wherein said editor portion has a function of having appliance placement specific of each user and so on inputted from said user terminal and converting user specific information such as said appliance placement into a predetermined format.

6. The propagation environment notification method in a radio communication system according to claim 5, wherein said display portion has a function of having said radio propagation environment information displayed on said user terminal.

7. A propagation environment notification method in a radio communication system constituted by a radio base station and a radio terminal, comprising:
    a first step of sending conditions about a user's area layout from a user terminal to a server via a communication line;
    a second step of generating said user's area radio propagation environment information based on said conditions by said server receiving said conditions; and
    a third step of sending said radio propagation environment information from said server to said user terminal via the communication line
    wherein the radio propagation environment information generated in said second step is information obtained from receipt electric power and delay variance information in each observation area in the case of dividing said area into a plurality of observation areas.

8. The propagation environment notification method in a radio communication system according to claim 7, wherein said receipt electric power and delay variance information is expressed in a visually identifiable form, and said radio propagation environment information corresponding to said receipt electric power and delay variance information is also expressed in a visually identifiable form.

9. The propagation environment notification method in a radio communication system according to claim 8, wherein said receipt electric power is expressed by brightness information, said delay variance information is expressed by chromaticity information, and said radio propagation environment information is expressed as color information obtained from said brightness information and said chromaticity information.

10. The propagation environment notification method in a radio communication system according to claim 8, wherein said receipt electric power is expressed by chromaticity information, said delay variance information is expressed by brightness information, and said radio propagation environment information is expressed as color information obtained from said brightness information and said chromaticity information.

11. The propagation environment notification method in a radio communication system according to claim 8, wherein brightness is kept constant and said receipt electric power and delay variance information is expressed by chromaticity, and said radio propagation environment information is expressed as color information with said brightness kept constant.

12. A propagation environment notification method in a radio communication system constituted by a radio base station and a radio terminal, comprising:
    a first step of sending conditions about a user's area layout from a user terminal to a server via a communication line;
    a second step of generating said user's area radio propagation environment information based on said conditions by said server receiving said conditions; and
    a third step of sending said radio propagation environment information from said server to said user terminal via the communication line
    wherein said second step is comprised of:
    defining the number of observation areas M for an observation area ID that is a variable for identifying observation areas;
    using ray tracing to estimate a propagation property in the observation area defined by said observation area ID;
    storing the receipt electric power and delay variance equivalent to the result obtained in said forty-second step in propagation property data having an arrangement with said observation area ID as an index;
    subtracting 1 from said observation area ID;
    making a determination on whether or not said observation area ID is greater than 1; and
    making a determination on possibility of communication in each observation area if said observation area ID is smaller than 1 as a result of this determination.

13. A propagation environment notification system in a radio communication system constituted by a radio base station and a radio terminal, comprising:
    condition sending means for sending conditions about the user's area layout from a user terminal to a server via a communication line;
    information generating means for generating said user's area radio propagation environment information based on said conditions by said server receiving said conditions; and
    information sending means for sending said radio propagation environment information from said server to said user terminal via the communication line,
    wherein said condition sending means comprises;
    start command sending means for sending a service start command from said user terminal to said server;
    software sending means for sending software for clients of predetermined form to said user terminal from said server receiving said service start command;
    condition inputting means for inputting said conditions from said user terminal based on said software for clients; and
    second condition sending means for sending said conditions from said user terminal to said server;
    wherein said condition inputting means is constituted by:
    inputting/editing means for performing input and edition of user conditions (said user's area appliance placement information and said radio base station information);
    determining means for making a determination on whether or not said user's conditions are correctly inputted;
    input completion determining means for making a determination on completion of said input of conditions; and
    format converting means for converting said input conditions into formats capable of being used on said server's part.

14. The propagation environment notification system in a radio communication system according to claim 13, wherein said inputting/editing means comprises:
    dividing means for dividing the appliance in said appliance placement information into predetermined shapes; and
    position information generating means for generating information of the position of said divided appliance.

15. The propagation environment notification system in a radio communication system according to claim 14, wherein said position information is three-dimensional information.

16. The propagation environment notification system in a radio communication system according to claim 13, wherein in said inputting/editing means, information of the position in which said radio base station is placed, information of antenna types and information of sending electric power are inputted as said radio base station information.

17. A propagation environment notification system in a radio communication system constituted by a radio base station and a radio terminal, comprising:
- condition sending means for sending conditions about the user's area layout from a user terminal to a server via a communication line;
- information generating means for generating said user's area radio propagation environment information based on said conditions by said server receiving said conditions; and
- information sending means for sending said radio propagation environment information from said server to said user terminal via the communication line;
- wherein said condition sending means comprises:
- start command sending means for sending a service start command from said user terminal to said server;
- software sending means for sending software for clients of predetermined form to said user terminal from said server receiving said service start command;
- condition inputting means for inputting said conditions from said user terminal based on said software for clients; and
- second condition sending means for sending said conditions from said user terminal to said server;
- wherein said software for clients comprises:
- an editor portion for said processing of obtaining conditions; and
- a display portion for said display processing;
- wherein said editor portion has a function of having appliance placement specific of each user and so on inputted from said user terminal and converting user specific information such as said appliance placement into a predetermined format.

18. A propagation environment notification system in a radio communication system constituted by a radio base station and a radio terminal, comprising:
- condition sending means for sending conditions about the user's area layout from a user terminal to a server via a communication line;
- information generating means for generating said user's area radio propagation environment information based on said conditions by said server receiving said conditions; and
- information sending means for sending said radio propagation environment information from said server to said user terminal via the communication line;
- wherein the radio propagation environment information generated by said information generation means is information obtained from receipt electric power and delay variance information in each observation area in the case of dividing said area environment into a plurality of observation areas.

19. The propagation environment notification system in a radio communication system according to claim 18, wherein said receipt electric power and delay variance information is expressed in a visually identifiable form, and said radio propagation environment information corresponding to said receipt electric power and delay variance information is also expressed in a visually identifiable form.

20. The propagation environment notification system in a radio communication system according to claim 19, wherein said receipt electric power is expressed by brightness information, said delay variance information is expressed by chromaticity information, and said radio propagation environment information is expressed as color information obtained from said brightness information and said chromaticity information.

21. The propagation environment notification system in a radio communication system according to claim 19, wherein said receipt electric power is expressed by chromaticity information, said delay variance information is expressed by brightness information, and said radio propagation environment information is expressed as color information obtained from said brightness information and said chromaticity information.

22. The propagation environment notification system in a radio communication system according to claim 19, wherein brightness is kept constant and said receipt electric power and delay variance information is expressed by chromaticity, and said radio propagation environment information is expressed as color information with said brightness kept constant.

23. A propagation environment notification system in a radio communication system constituted by a radio base station and a radio terminal, comprising:
- condition sending means for sending conditions about the user's area layout from a user terminal to a server via a communication line;
- information generating means for generating said user's area radio propagation environment information based on said conditions by said server receiving said conditions; and
- information sending means for sending said radio propagation environment information from said server to said user terminal via the communication line;
- wherein said information generating means is constituted by:
- M defining means for defining the number of observation areas M for an observation area ID that is a variable for identifying observation areas;
- propagation property estimating means for using ray tracing to estimate a propagation property in the observation area defined by said observation area ID;
- storing means for storing the receipt electric power and delay variance equivalent to the result obtained by propagation property estimating means in propagation property data having an arrangement with said observation area ID as an index;
- subtracting means for subtracting 1 from said observation area ID, ID determining means for making a determination on whether or not said observation area ID is greater than 1; and
- communication possibility determining means for making a determination on possibility of communication in each observation area if said observation area ID is smaller than 1 as a result of this determination.

24. A user terminal for use in a propagation environment notification system in a radio communication system constituted by a radio base station and a radio terminal, comprising:
- condition sending means for sending conditions about the user's area placement from a user terminal to an object apparatus via a communication line; and
- information receiving means for receiving radio propagation environment information for said conditions from said object apparatus via the communication line;

wherein said condition sending means comprises:

start command sending means for sending a service start command from said user terminal to said object apparatus;

condition inputting means for inputting said conditions from said user terminal based on software for clients of predetermined form sent to said user terminal from said object apparatus receiving said service start command; and second condition sending means for sending said conditions from said user terminal to said object apparatus;

wherein said condition inputting means is constituted by:

inputting/editing means for performing input and edition of user conditions (said user's area appliance placement information and said radio base station information);

determining means for making a determination on whether or not said user's conditions are correctly inputted;

input completion determining means for making a determination on completion of said input of conditions; and format converting means for converting said input conditions into formats capable of being used on said object apparatus's part.

25. The user terminal according to claim 24, wherein said inputting/editing means comprises:

dividing means for dividing the appliance in said appliance placement information into predetermined shapes; and position information generating means for generating information of the position of said divided appliance.

26. The user terminal according to claim 25, wherein said position information is three-dimensional information.

27. The user terminal according to claim 24, wherein in said inputting/editing means, information of the position in which said radio base station is placed, information of antenna types and information of sending electric power are inputted as said radio base station information.

28. A user terminal for use in a propagation environment notification system in a radio communication system constituted by a radio base station and a radio terminal, comprising:

condition sending means for sending conditions about the user's area placement from a user terminal to an object apparatus via a communication line; and information receiving means for receiving radio propagation environment information for said conditions from said object apparatus via the communication line;

wherein said condition sending means comprises:

start command sending means for sending a service start command from said user terminal to said object apparatus;

condition inputting means for inputting said conditions from said user terminal based on software for clients of predetermined form sent to said user terminal from said object apparatus receiving said service start command; and second condition sending means for sending said conditions from said user terminal to said object apparatus;

wherein said software for clients comprises:

processing of obtaining said conditions;

processing of converting said conditions into formats capable of being used in processing on said object apparatus's part; and format conversion and display processing for presenting to the user' said radio propagation environment information obtained through, the processing on said object apparatus's part;

wherein said software for clients comprises:

an editor portion for said processing of obtaining conditions; and a display portion for said display processing, wherein said editor portion has a function of having appliance placement specific of each user and so on inputted from said user terminal and converting user'specific information such as said appliance placement into a predetermined format.

29. The user terminal according to claim 28, wherein said display portion has a function of having said radio propagation environment information displayed on said user terminal in a form convenient for the user.

30. A user terminal for use in a propagation environment notification system in a radio communication system constituted by a radio base station and a radio terminal, comprising:

condition sending means for sending conditions about the user's area placement from a user terminal to an object apparatus via a communication line; and information receiving means for receiving radio propagation environment information for said conditions from said object apparatus via the communication line;

wherein the radio propagation environment information generated by said information generation means is information obtained from receipt electric power and delay variance information in each observation area in the case of dividing said area environment into a plurality of observation areas.

31. The user terminal according to claim 30, wherein said receipt electric power and delay variance information is expressed in a visually identifiable form, and said radio propagation environment information corresponding to said receipt electric power and delay variance information is also expressed in a visually identifiable form.

32. The user terminal according to claim 30, wherein said receipt electric power is expressed by brightness information, said delay variance information is expressed by chromaticity information, and said radio propagation environment information is expressed as color information obtained from said brightness information and said chromaticity information.

33. The user terminal according to claim 31, wherein said receipt electric power is expressed by chromatictry information, said delay variance information is expressed by brightness information, and said radio propagation environment information is expressed as color information obtained from said brightness information and said chromaticity information.

34. The user terminal according to claim 31, wherein brightness is kept constant and said receipt electric power and delay variance information is expressed by chromaticity, and said radio propagation environment information is expressed as color information with said brightness kept constant.

35. A user terminal for use in a propagation environment notification system in a radio communication system constituted by a radio base station and a radio terminal, comprising:

condition sending means for sending conditions about the user's area placement from a user terminal to an object apparatus via a communication line; and information receiving means for receiving radio propagation environment information for said conditions from said object apparatus via the communication line;

wherein said information generating means is constituted by:

M defining means for defining the number of observation areas M for an observation area ID that is a variable for identifying observation areas, propagation property estimating means for using ray tracing to estimate a propagation property in the observation area defined by said observation area ID;

storing data means for storing the receipt electric power and delay variance equivalent to the result obtained by propagation property estimating means in propagation property data having an arrangement with said observation area ID as an index, subtracting means for subtracting 1 from said observation area ID;

ID determining means for making a determination on whether or not said observation area ID is greater than 1; and communication possibility determining means for making a determination on possibility of communication in each observation area if said observation area ID is smaller than 1 as a result of this determination.

36. A server for use in a propagation environment notification system in a radio communication system constituted by a radio base station and a radio terminal, comprising:

condition receiving means for receiving conditions about the user's area layout from a user apparatus via a communication line; and information sending means for sending radio propagation environment information for said conditions to said user apparatus via the communication line;

wherein said condition receiving means comprises:

start command receiving means for receiving a service start command from said user apparatus;

software sending means for sending software for clients of predetermined form to said user apparatus after receiving said service start command; and second condition receiving means for receiving said conditions inputted from said user apparatus based on said software for clients;

wherein the means for inputting said conditions by said user apparatus is constituted by:

inputting/editing means for performing input and edition of user conditions (said user's area appliance placement information and said radio base station information);

determining means for making a determination on whether or not said user's conditions are correctly inputted;

input completion determining means for making a determination on completion of said input of conditions; and format convening means for converting said input conditions into formats capable of being used on said server's part.

37. The server according to claim 36, wherein said inputting/editing means comprises:

dividing means for dividing the appliance in said appliance placement information into predetermined shapes; and position information generating means for generating information of the position of said divided appliance.

38. The server according to claim 37, wherein said position information is three-dimensional information.

39. The server according to claim 36, wherein in said inputting/editing means, information of the position in which said radio base station is placed, information of antenna types and information of sending electric power are inputted as said radio base station information.

40. A server for use in a propagation environment notification system in a radio communication system constituted by a radio base station and a radio terminal, comprising:

condition receiving means for receiving conditions about the user's area layout from a user apparatus via a communication line; and information sending means for sending radio propagation environment information for said conditions to said user apparatus via the communication line;

wherein said condition receiving means comprises:

start command receiving means for receiving a service start command from said user apparatus;

software sending means for sending software for clients of predetermined form to said user apparatus after receiving said service start command; and second condition receiving means for receiving said conditions inputted from said user apparatus based on said software for clients;

wherein said software for clients comprises:

an editor portion for said processing of obtaining conditions; and a display processing;

wherein said editor portion has a function of having appliance placement specific of each user and so on inputted from said user apparatus and converting user'specific information such as said appliance placement into a predetermined format.

41. A server for use in a propagation environment notification system in a radio communication system constituted by a radio base station and a radio terminal, comprising:

condition receiving means for receiving conditions about the user's area layout from a user apparatus via a communication line; and information sending means for sending radio propagation environment information for said conditions to said user apparatus via the communication line;

wherein said radio propagation environment information is information obtained from receipt electric power and delay variance information in each observation area in the case of dividing said area environment into a plurality of observation areas.

42. The server according to claim 41, wherein said receipt electric power and delay variance information is expressed in a visually identifiable form, and said radio propagation environment information corresponding to said receipt electric power and delay variance information is also expressed in a visually identifiable form.

43. The server according to claim 42, wherein said receipt electric power is expressed by brightness information, said delay variance information is expressed by chromaticity information, and said radio propagation environment information is expressed as color information obtained from said brightness information and said chromaticity information.

44. The server according to claim 42, wherein said receipt electric power is expressed by chromaticity information, said delay variance information is expressed by brightness information, and said radio propagation environment information is expressed as color information obtained from said brightness information and said chromaticity information.

45. The server according to claim 42, wherein brightness is kept constant and said receipt electric power and delay variance information is expressed by chromaticity, and said radio propagation environment information is expressed as color information with said brightness kept constant.

46. A server for use in a propagation environment notification system in a radio communication system constituted by a radio base station and a radio terminal, comprising:

condition receiving means for receiving conditions about the user's area layout from a user apparatus via a communication line; and information sending means for sending radio propagation environment information for said conditions to said user apparatus via the communication line;

wherein said radio propagation environment information is generated by;

M defining means for defining the number of observation areas M for an observation area ID that is a variable for identifying observation areas;

propagation property estimating means for using ray tracing to estimate a propagation property in the observation area defined by said observation area ID;

storing data means for storing the receipt electric power and delay variance equivalent to the result obtained by propagation property estimating means in propagation property data having an arrangement with said observation area ID as an index;

subtracting means for subtracting 1 from said observation area ID;

ID determining means for making a determination on whether or not said observation area ID is greater than 1; and communication possibility determining means for making a determination on possibility of communication in each observation area if said observation area ID is smaller than 1 as a result of this determination.

47. A record medium recording therein a control program of a propagation environment notification method in a radio communication system constituted by a radio base station and a radio terminal, said propagation environment notification method comprising:

a first step of sending conditions about the user's area layout from a user terminal to a server via a communication line;

a second step of generating said user's area radio propagation environment information based on said conditions by said server receiving said conditions; and a third step of sending said radio propagation environment information from said server to said user terminal via the communication line, wherein said first step is comprised of:

a fourth step of performing input and edition of user conditions (said user's area appliance placement information and said radio base station information);

a fifth step of making a determination on whether or not said user's conditions arc correctly inputted;

a sixth step of making a determination on completion of said input of conditions;

a seventh step of converting said input conditions into formats capable of being used on said server's part; and a condition inputting step of inputting said conditions by said user terminal; and a control program comprised of these fourth to seventh steps is recorded in said record medium.

48. The record medium according to claim 47, wherein said radio base station is configured as a plurality of radio base stations, and said second step comprises:

an eighth step of estimating a propagation environment for a radio wave emitted from each of said plurality of radio base stations in said user's area layout to generate individual radio wave propagation environment information;

ninth step of using said individual radio wave propagation environment information to calculate a signal-to-interference ratio expressed by the ratio between the receipt electric power from targeted said radio base stations and the receipt electric power from non-targeted said radio base stations; and a tenth step of generating said radio propagation environment information for estimating the possibility of communication in said user's area layout, based on said individual radio wave propagation environment information and said signal-to-interference ratio.

49. The record medium according to claim 48, wherein said ninth step comprises:

an eleventh step of computing the sum of receipt electric power from non-targeted said radio base stations (total interference electric power); and a twelfth step of computing the ratio between the receipt electric power from targeted said radio base stations and said total interference electric power (signal-to-interference ratio).

50. The record medium according to claim 48 or 49, wherein said ninth step comprises:

a thirteenth step of computing the receipt electric power from non-targeted said radio base stations at positions in which targeted said radio base stations are placed, as the interference electric power in targeted base stations; and a fourteenth step of computing the ratio between the receipt electric power when targeted said radio base stations receive radio waves sent from respective observation points and the interference electric power in targeted said base stations (signal-to-interference ratio).

51. The record medium according to claim 50, wherein the signal-to-interference ratio obtained in said twelfth step or the signal-to-interference ratio obtained in said fourteenth step, whichever smaller, is defined as a signal-to-interference ratio.

52. The record medium according to claim 48, wherein said tenth step comprises:

an eleventh step of computing an interference degradation level based on the throughput threshold value of said radio base stations and said signal-to-interference ratio;

a twelfth step of evaluating receipt possibility from estimated values of the receipt electric power and delay variance of radio waves sent from said radio base stations; and a thirteenth step of generating said radio propagation environment information for making a determination on receipt properties based on the interference degradation level information obtained in said seventy-first step and the receipt possibility evaluation information obtained in said seventy-second step.

53. The record medium according to claim 52, wherein said interference degradation level information and receipt possibility evaluation information is expressed in a visually identifiable form, and said radio propagation environment information corresponding to said interference degradation level information and receipt possibility evaluation information is also expressed in a visually identifiable form.

54. The record medium according to claim 53, wherein said interference degradation level information is expressed by brightness information, said receipt possibility evaluation information is expressed by chromaticity information, and said radio propagation environment information is expressed as color information obtained from said brightness information and said chromaticity information.

55. The record medium according to claim 53, wherein said interference degradation level information is expressed by chromaticity information, said receipt possibility evaluation information is expressed by brightness information, and said radio propagation environment information is expressed as color information obtained from said brightness information and said chromaticity information.

56. The record medium according to claim 53, wherein brightness is kept constant and said interference degradation level information and receipt possibility evaluation information is expressed by chromaticity, and said radio propagation environment information is expressed as color information with said brightness kept constant.

57. The record medium according to claim 48, wherein a second radio wave emission source different from said radio base station is included as a radio wave emission source in said eighth step, and in said eighth step, radio waves emitted from said second radio wave emission source are also covered as targets for estimating propagation environments.

58. The propagation environment notification method in a radio communication system according to claim 48, wherein said interference degradation level information is expressed by brightness information, said receipt possibility evaluation information is expressed by chromaticity information, and said radio propagation environment information is expressed as color information obtained from said brightness information and said chromaticity information.

59. A record medium recording therein a control program of a propagation environment notification method in a radio communication system constituted by a radio base station and a radio terminal, said propagation environment notification method comprising:
- a first step of sending conditions about the user's area layout from a user terminal to a server via a communication line;
- a second step of generating said user's area radio propagation environment information based on said conditions by said server receiving said conditions; and
- a third step of sending said radio propagation environment information from said server to said user terminal via the communication line,
- wherein said second step is comprised of:
- defining the number of observation areas M for an observation area ID that is a variable for identifying observation areas;
- using ray tracing to estimate a propagation property in the observation area defined by said observation area ID;
- storing the receipt electric power and delay variance equivalent to the result obtained in said forty-second step in propagation property data having an arrangement with said observation area ID as an index;
- subtracting 1 from said observation area ID;
- making a determination on whether or not said observation area ID is greater than 1; and
- making a determination on possibility of communication in each observation area if said observation area ID is smaller than 1 as a result of this determination, and a control program comprised of these forty-first to forty-sixth steps is recorded in said record medium.

60. The record medium according to claim 59, wherein said receipt electric power and delay variance information is expressed in a visually identifiable form, and said radio propagation environment information corresponding to said receipt electric power and delay variance information is also expressed in a visually identifiable form.

61. The record medium according to claim 60, wherein said receipt electric power is expressed by brightness information, said delay variance information is expressed by chromaticity information, and said radio propagation environment information is expressed as color information obtained from said brightness information and said chromaticity information.

62. The record medium according to claim 60, wherein said receipt electric power is expressed by chromaticity information, said delay variance information is expressed by brightness information, and said radio propagation environment information is expressed as color information obtained from said brightness information and said chromaticity information.

63. The record medium according to claim 60, wherein brightness is kept constant and said receipt electric power and delay variance information is expressed by chromaticity, and said radio propagation environment information is expressed as color information with said brightness kept constant.

64. A propagation environment notification method in a radio communication system constituted by a radio base station and a radio terminal, comprising:
- a first step of sending conditions about a user's area layout from a user terminal to a server via a communication line;
- a second step of generating said user's area radio propagation environment information based on said conditions by said server receiving said conditions; and
- a third step of sending said radio propagation environment information from said server to said user terminal via the communication line,
- wherein said radio base station is configured as a plurality of radio base stations, and said second step comprises:
- estimating a propagation environment for a radio wave emitted from each of said plurality of radio base stations in said user's area layout to generate individual radio wave propagation environment information;
- using said individual radio wave propagation environment information to calculate a signal-to-interference ratio expressed by the ratio between the receipt electric power from targeted said radio base stations and the receipt electric power from non-targeted said radio base stations; and
- generating said radio propagation environment information for estimating the possibility of communication in said user's area layout, based on said individual radio wave propagation environment information and said signal-to-interference ratio.

65. The propagation environment notification method in a radio communication system according to claim 64, wherein said step of calculating signal-to-interference ratio comprises:
- computing the sum of receipt electric power from non-targeted said radio base stations (total interference voltage); and
- computing the ratio between the receipt electric power from targeted said radio base stations and said total interference electric power (signal-to-interference ratio).

66. The propagation environment notification method in a radio communication system according to claim 64, wherein said step of calculating signal-to-interference ratio comprises:

a fourth step of computing the receipt electric power from non-targeted said radio base stations at positions in which targeted said radio base stations are placed, as the interference electric power in targeted base stations; and a fifth step of computing the ratio between the receipt electric power when targeted said radio base stations receive radio waves sent from respective observation points and the interference electric power in targeted said base stations (signal-to-interference ratio).

67. The propagation environment notification method in a radio communication system according to claim 66, wherein the signal-to-interference ratio obtained in said fourth step or the signal-to-interference ratio obtained in said fifth step, whichever smaller, is defined as a signal-to-interference ratio.

68. The propagation environment notification method in a radio communication system according to claim 64, wherein said step of generating said radio propagation environment information comprises:

computing an interference degradation level based on the throughput threshold value of said radio base stations and said signal-to-interference ratio;

evaluating receipt possibility from estimated values of the receipt electric power and delay variance of radio waves sent from said radio base stations; and generating said radio propagation environment information for making a determination on receipt properties based on the interference degradation level information obtained in said computing step and the receipt possibility evaluation information obtained in said evaluating step.

69. The propagation environment notification method in a radio communication system according to claim 68, wherein said interference degradation level information and receipt possibility evaluation information is expressed in a visually identifiable form, and said radio propagation environment information corresponding to said interference degradation level information and receipt possibility evaluation information is also expressed in a visually identifiable form.

70. The propagation environment notification method in a radio communication system according to claim 69, wherein said interference degradation level information is expressed by chromaticity information, said receipt possibility evaluation information is expressed by brightness information, and said radio propagation environment information is expressed as color information obtained from said brightness information and said chromaticity information.

71. The propagation environment notification method in a radio communication system according to claim 69, wherein brightness is kept constant and said interference degradation level information and receipt possibility evaluation information is expressed by chromaticity, and said radio propagation environment information is expressed as color information with said brightness kept constant.

72. The propagation environment notification method in a radio communication system according to claim 64, wherein a second radio wave emission source different from said radio base station is included as a radio wave emission source in said fifty-first step, and in said fifty-first step, radio waves emitted from said second radio wave emission source are also covered as targets for estimating propagation environments.

73. A propagation environment notification system in a radio communication system constituted by a radio base station and a radio terminal, comprising:

condition sending means for sending conditions about the user's area layout from a user terminal to a server via a communication line;

information generating means for generating said user's area radio propagation environment information based on said conditions by said server receiving said conditions; and information sending means for sending said radio propagation environment information from said server to said user terminal via the communication line, wherein said radio base station is configured as a plurality of radio base stations, and said information generating means comprises:

individual radio wave propagation environment information generating means for estimating a propagation environment for a radio wave emitted from each of said plurality of radio base stations in said user's area layout to generate individual radio wave propagation environment information;

signal-to-interference ratio calculating means for using said individual radio wave propagation environment information to calculate a signal-to-interference ratio expressed by the ratio between the receipt electric power from targeted said radio base stations and the receipt electric power from non-targeted said radio base stations; and communication possibility estimating means for generating said radio propagation environment information for estimating the possibility of communication in said user's area layout, based on said individual radio wave propagation environment information and said signal-to-interference ratio.

74. The propagation environment notification system in a radio communication system according to claim 73, wherein said signal-to-interference ratio calculating means comprises:

total interference electric power computing means for computing the sum of receipt electric power from non-targeted said radio base stations (total interference electric power); and signal-to-interference ratio computing means for computing the ratio between the receipt electric power from targeted said radio base stations and said total interference electric power (signal-to-interference ratio).

75. The propagation environment notification system in a radio communication system according to claim 73, wherein said signal-to-interference ratio calculating means comprises:

first computing means for computing the receipt electric power from non-targeted said radio base stations at positions in which targeted said radio base stations are placed, as the interference electric power in targeted base stations; and second computing means for computing the ratio between the receipt electric power when targeted said radio base stations receive radio waves sent from respective observation points and the interference electric power in targeted said base stations (signal-to-interference ratio).

76. The propagation environment notification system in a radio communication system according to claim 75, wherein the signal-to-interference ratio obtained by said signal-to-interference ratio calculating means or the signal-to-interference ratio obtained by said second computing means, whichever smaller, is defined as a signal-to-interference ratio.

77. The propagation environment notification system in a radio communication system according to claim 73, wherein said communication possibility estimating means comprises:

interference degradation level computing means for computing an interference degradation level based on the throughput threshold value of said radio base stations and said signal-to-interference ratio;

receipt possibility evaluating means for evaluating receipt possibility from estimated values of the receipt electric power and delay variance of radio waves sent from said radio base stations; and receipt property determination result generating means for making a determination on receipt properties based on the interference degradation level information obtained by said interference degradation level computing means and the receipt possibility evaluation information obtained by said receipt possibility evaluating means to generate said radio propagation environment information for making a determination on receipt properties.

78. The propagation environment notification system in a radio communication system according to claim 77, wherein said interference degradation level information and receipt possibility evaluation information is expressed in a visually identifiable form, and said radio propagation environment information corresponding to said interference degradation level information and receipt possibility evaluation information is also expressed in a visually identifiable form.

79. The propagation environment notification system in a radio communication system according to claim 78, wherein said interference degradation level information is expressed by brightness information, said receipt possibility evaluation information is expressed by chromaticity information, and said radio propagation environment information is expressed as color information obtained from said brightness information and said chromaticity information.

80. The propagation environment notification system in a radio communication system according to claim 78, wherein said interference degradation level information is expressed by chromaticity information, said receipt possibility evaluation information is expressed by brightness information, and said radio propagation environment information is expressed as color information obtained from said brightness information and said chromaticity information.

81. The propagation environment notification system in a radio communication system according to claim 78, wherein brightness is kept constant and said interference degradation level information and receipt possibility evaluation information is expressed by chromaticity, and said radio propagation environment information is expressed as color information with said brightness kept constant.

82. The propagation environment notification system in a radio communication system according to claim 73, wherein a second radio wave emission source different from said radio base station is included as a radio wave emission source in said individual radio wave propagation environment information generating means, and said individual radio wave propagation environment information generating means also covers radio waves emitted from said second radio wave emission source as targets for estimating propagation environments.

83. A propagation environment notification system in a radio communication system constituted by a radio base station and a radio terminal, comprising:

condition sending means for sending conditions about the user's area layout from a user terminal to a server via a communication line;

information generating means for generating said user's area radio propagation environment information based on said conditions by said server receiving said conditions; and information sending means for sending said radio propagation environment information from said server to said user terminal via the communication line, wherein said radio base station is configured as a plurality of radio base stations, and said information receiving means comprises:

individual radio wave propagation environment information generating means for estimating a propagation environment for a radio wave emitted from each of said plurality of radio base stations in said user's area layout to generate individual radio wave propagation environment information;

signal-to-interference ratio calculating means for using said individual radio wave propagation environment information to calculate a signal-to-interference ratio expressed by the ratio between the receipt electric power from targeted said radio base stations and the receipt electric power from non-targeted said radio base stations; and communication possibility information receiving means for receiving said radio propagation environment information for estimating the possibility of communication in said user's area layout, based on said individual radio wave propagation environment information and said signal-to-interference ratio.

84. The user terminal according to claim 83, wherein said signal-to-interference ratio calculating means comprises:

total interference electric power computing means for computing the sum of receipt electric power from non-targeted said radio base stations (total interference electric power); and signal-to-interference ratio computing means for computing the ratio between the receipt electric power from targeted said radio base stations and said total interference electric power (signal-to-interference ratio).

85. The user terminal according to claim 83, wherein said signal-to-interference ratio calculating means comprises:

first computing means for computing the receipt electric power from non-targeted said radio base stations at positions in which targeted said radio base stations are placed, as the interference electric power in targeted base stations; and second computing means for computing the ratio between the receipt electric power when targeted said radio base stations receive radio waves sent from respective observation points and the interference electric power in targeted said base stations (signal-to-interference ratio).

86. The user terminal according to claim 85, wherein the signal-to-interference ratio obtained by said signal-to-interference ratio calculating means or the signal-to-interference ratio obtained by said second computing means, whichever smaller, is defined as a signal-to-interference ratio.

87. The user terminal according to claim 83, wherein said communication possibility information receiving means comprises interference degradation level computing means for computing an interference degradation level based on the throughput threshold value of said radio base stations and said signal-to-interference ratio;

receipt possibility evaluating means for evaluating receipt possibility from estimated values of the receipt electric power and delay variance of radio waves sent from said radio base stations; and radio propagation environment information receiving means for receiving said radio propagation environment information for making a determination on receipt properties based on the interference degradation level information obtained by said interference degradation level computing means and the receipt possibility evaluation information obtained by said receipt possibility evaluating means.

88. The user terminal according to claim 87, wherein said interference degradation level information and receipt possibility evaluation information is expressed in a visually identifiable form, and said radio propagation environment information corresponding to said interference degradation level information and receipt possibility evaluation information is also expressed in a visually identifiable form.

89. The user terminal according to claim 88, wherein said interference degradation level information is expressed by brightness information, said receipt possibility evaluation information is expressed by chromaticity information, and said radio propagation environment information is expressed as color information obtained from said brightness information and said chromaticity information.

90. The user terminal according to claim 88, wherein said interference degradation level information is expressed by chromaticity information, said receipt possibility evaluation information is expressed by brightness information, and said radio propagation environment information is expressed as color information obtained from said brightness information and said chromaticity information.

91. The user terminal according to claim 88, wherein brightness is kept constant and said interference degradation level information and receipt possibility evaluation information is expressed by chromaticity, and said radio propagation environment information is expressed as color information with said brightness kept constant.

92. The user terminal according to claim 83, wherein a second radio wave emission source different from said radio base station is included as a radio wave emission source in said individual radio wave propagation environment information generating means, and said individual radio wave propagation environment information generating means also covers radio waves emitted from said second radio wave emission source as targets for estimating propagation environments.

93. A server for use in a propagation environment notification system in a radio communication system constituted by a radio base station and a radio terminal, comprising:
condition receiving means for receiving conditions about the user's area layout from a user apparatus via a communication line; and
information sending means for sending radio propagation environment information for said conditions to said user apparatus via the communication line,
wherein said radio base station is configured as a plurality of radio base stations, and said information sending means comprises:
individual radio wave propagation environment information generating means for estimating a propagation environment for a radio wave emitted from each of said plurality of radio base stations in said user's area layout to generate individual radio wave propagation environment information;
signal-to-interference ratio calculating means for using said individual radio wave propagation environment information to calculate a signal-to-interference ratio expressed by the ratio between the receipt electric power from targeted said radio base stations and the receipt electric power from non-targeted said radio base stations; and
communication possibility information sending means for sending said radio propagation environment information for estimating the possibility of communication in said user's area layout, based on said individual radio wave propagation environment information and said signal-to-interference ratio.

94. The server according to claim 93, wherein said signal-to-interference ratio calculating means comprises:
total interference electric power computing means for computing the sum of receipt electric power from non-targeted said radio base stations (total interference electric power); and
signal-to-interference ratio computing means for computing the ratio between the receipt electric power from targeted said radio base stations and said total interference electric power (signal-to-interference ratio).

95. The server according to claim 93, wherein said signal-to-interference ratio calculating means comprises:
first computing means for computing the receipt electric power from non-targeted said radio base stations at positions in which targeted said radio base stations are placed, as the interference electric power in targeted base stations; and
second computing means for computing the ratio between the receipt electric power when targeted said radio base stations receive radio waves sent from respective observation points and the interference electric power in targeted said base stations (signal-to-interference ratio).

96. The server according to claim 95, wherein the signal-to-interference ratio obtained by said signal-to-interference ratio calculating means or the signal-to-interference ratio obtained by said second computing means, whichever smaller, is defined as a signal-to-interference ratio.

97. The server according to claim 93, wherein said communication possibility information sending means comprises:
interference degradation level computing means for computing an interference degradation level based on the throughput threshold value of said radio base stations and said signal-to-interference ratio;
receipt possibility evaluating means for evaluating receipt possibility from estimated values of the receipt electric power and delay variance of radio waves sent from said radio base stations; and
radio propagation environment information sending means for sending said radio propagation environment information for making a determination on receipt properties based on the interference degradation level information obtained by said interference degradation level computing means and the receipt possibility evaluation information obtained by said receipt possibility evaluating means.

98. The server according to claim 97, wherein said interference degradation level information and receipt possibility evaluation information is expressed in a visually identifiable form, and said radio propagation environment information corresponding to said interference degradation level information and receipt possibility evaluation information is also expressed in a visually identifiable form.

99. The server according to claim 98, wherein said interference degradation level information is expressed by brightness information, said receipt possibility evaluation information is expressed by chromaticity information, and said radio propagation environment information is expressed as color information obtained from said brightness information and said chromaticity information.

100. The server according to claim 98, wherein said interference degradation level information is expressed by chromaticity information, said receipt possibility evaluation information is expressed by brightness information, and said radio propagation environment information is expressed as color information obtained from said brightness information and said chromaticity information.

101. The server according to claim 98, wherein brightness is kept constant and said interference degradation level information and receipt possibility evaluation information is expressed by chromaticity, and said radio propagation environment information is expressed as color information with said brightness kept constant.

102. The server according to claim 93, wherein a second radio wave emission source different from said radio base station is included as a radio wave emission source in said individual radio wave propagation environment information generating means, and said individual radio wave propagation environment information generating means also covers radio waves emitted from said second radio wave emission source as targets for estimating propagation environments.

* * * * *